United States Patent
O'Neill et al.

(10) Patent No.: US 7,668,541 B2
(45) Date of Patent: *Feb. 23, 2010

(54) ENHANCED TECHNIQUES FOR USING CORE BASED NODES FOR STATE TRANSFER

(75) Inventors: Alan O'Neill, Henley Beach (AU); M. Scott Corson, Gillette, NJ (US); George Tsirtsis, London (GB); Vincent Park, Budd Lake, NJ (US); Richard J. Dynarski, Freehold, NJ (US); David R. Mazik, Howell, NJ (US); Leonid Sigal, Brooklyn, NY (US)

(73) Assignee: Qualcomm Incorporated, San Diego, CA (US)

( * ) Notice: Subject to any disclaimer, the term of this patent is extended or adjusted under 35 U.S.C. 154(b) by 642 days.

This patent is subject to a terminal disclaimer.

(21) Appl. No.: 10/910,960

(22) Filed: Aug. 4, 2004

(65) Prior Publication Data

US 2005/0063324 A1 Mar. 24, 2005

Related U.S. Application Data

(63) Continuation-in-part of application No. 10/369,998, filed on Feb. 18, 2003, now Pat. No. 6,862,446.

(60) Provisional application No. 60/444,299, filed on Jan. 31, 2003.

(51) Int. Cl.
*H04Q 7/20* (2006.01)
(52) U.S. Cl. .................. 455/432.1; 455/433; 455/435.1; 455/439; 455/440; 370/331; 370/328; 379/333
(58) Field of Classification Search .............. 455/432.1, 455/433, 435.1, 439, 440, 560; 370/328; 379/333
See application file for complete search history.

(56) References Cited

U.S. PATENT DOCUMENTS 4,833,701 A 5/1989 Comroe et al.

(Continued)

FOREIGN PATENT DOCUMENTS

CN 1345518 A 4/2002

(Continued)

OTHER PUBLICATIONS

International Search Report and Written Opinion, Apr. 26, 2006 from International Application No. PCT/US2005/027798. pp. 1-7.

(Continued)

*Primary Examiner*—Minh D Dao
(74) *Attorney, Agent, or Firm*—Michael P. Straub; Kam T. Tam

(57) ABSTRACT

Methods and apparatus for storing, manipulating, retrieving, and forwarding state, e.g., context and other information, used to support communications sessions with one or more end nodes, e.g., mobile devices, are described. Various features are directed to a mobile node controlling the transfer of state from a first access node to a second access node during a handoff operation thereby eliminating any need for state transfer messages to be transmitted between the second access node and the first access node during handoff. Other features of the invention are directed to the use of a core network node to store state information. State information stored in the core node can be accessed and used by access nodes in cases where a mobile node does not send a state transfer message during a handoff, e.g., because communication with the first access node is lost or because such messages are not supported.

26 Claims, 15 Drawing Sheets

U.S. PATENT DOCUMENTS

| | | | |
|---|---|---|---|
| 5,200,952 A | 4/1993 | Bernstein et al. | |
| 5,229,992 A | 7/1993 | Jurkevich et al. | |
| 5,247,516 A | 9/1993 | Bernstein et al. | |
| 5,251,209 A | 10/1993 | Jurkevich et al. | |
| 5,267,261 A | 11/1993 | Blakeney, II et al. | |
| 5,491,835 A | 2/1996 | Sasuta et al. | |
| 5,572,528 A | 11/1996 | Shuen | |
| 5,574,720 A | 11/1996 | Lee | |
| 6,018,521 A * | 1/2000 | Timbs et al. | 370/342 |
| 6,097,952 A * | 8/2000 | Kawabata | 455/435.1 |
| 6,144,671 A | 11/2000 | Perinpanathan et al. | |
| 6,161,008 A | 12/2000 | Lee et al. | |
| 6,163,692 A | 12/2000 | Chakrabarti et al. | |
| 6,195,705 B1 | 2/2001 | Leung | |
| 6,256,300 B1 | 7/2001 | Ahmed et al. | |
| 6,308,267 B1 | 10/2001 | Gremmelmaier | |
| 6,345,043 B1 * | 2/2002 | Hsu | 370/324 |
| 6,347,091 B1 | 2/2002 | Wallentin et al. | |
| 6,366,561 B1 | 4/2002 | Bender | |
| 6,397,065 B1 | 5/2002 | Huusko et al. | |
| 6,400,722 B1 | 6/2002 | Chuah et al. | |
| 6,445,922 B1 | 9/2002 | Hiller et al. | |
| 6,446,127 B1 | 9/2002 | Schuster et al. | |
| 6,456,604 B1 * | 9/2002 | Lee et al. | 370/328 |
| 6,466,964 B1 | 10/2002 | Leung et al. | |
| 6,529,732 B1 | 3/2003 | Vainiomaki et al. | |
| 6,553,227 B1 | 4/2003 | Ho et al. | |
| 6,611,547 B1 | 8/2003 | Rauhala | |
| 6,714,777 B1 | 3/2004 | Naqvi et al. | |
| 6,754,492 B1 | 6/2004 | Stammers et al. | |
| 6,763,007 B1 | 7/2004 | La Porta et al. | |
| 6,771,962 B2 | 8/2004 | Saifullah et al. | |
| 6,862,446 B2 * | 3/2005 | O'Neill et al. | 455/422.1 |
| 6,970,445 B2 | 11/2005 | O'Neill et al. | |
| 6,990,337 B2 | 1/2006 | O'Neill et al. | |
| 7,130,291 B1 * | 10/2006 | Kim et al. | 370/341 |
| 7,177,641 B1 * | 2/2007 | Miernik et al. | 455/435.1 |
| 2001/0036164 A1 | 11/2001 | Kakemizu et al. | |
| 2001/0041571 A1 | 11/2001 | Yuan et al. | |
| 2001/0046223 A1 | 11/2001 | Malki et al. | |
| 2002/0015396 A1 | 2/2002 | Jung | |
| 2002/0018456 A1 | 2/2002 | Kakemizu et al. | |
| 2002/0026527 A1 | 2/2002 | Das et al. | |
| 2002/0068565 A1 | 6/2002 | Purnadi et al. | |
| 2002/0075823 A1 * | 6/2002 | Lee et al. | 370/328 |
| 2002/0091860 A1 | 7/2002 | Kalliokulju et al. | |
| 2002/0115432 A1 | 8/2002 | Roeder | |
| 2002/0126701 A1 | 9/2002 | Requena | |
| 2002/0136226 A1 | 9/2002 | Christoffel et al. | |
| 2002/0191593 A1 | 12/2002 | O'Neill et al. | |
| 2003/0012179 A1 | 1/2003 | Yano et al. | |
| 2003/0078047 A1 | 4/2003 | Lee et al. | |
| 2003/0092444 A1 | 5/2003 | Sengodan et al. | |
| 2003/0103496 A1 | 6/2003 | Lakshmi | |
| 2003/0119488 A1 | 6/2003 | Hans et al. | |
| 2003/0137961 A1 | 7/2003 | Tsirtsis et al. | |
| 2003/0176188 A1 | 9/2003 | O'Neill | |
| 2003/0204599 A1 | 10/2003 | Trossen et al. | |
| 2003/0210666 A1 | 11/2003 | Trossen et al. | |
| 2003/0212764 A1 | 11/2003 | Trossen et al. | |
| 2003/0214922 A1 | 11/2003 | Shahrier | |
| 2003/0228868 A1 | 12/2003 | Turanyi et al. | |
| 2004/0018841 A1 * | 1/2004 | Trossen | 455/436 |
| 2004/0057450 A1 | 3/2004 | Okuyama | |
| 2004/0085942 A1 | 5/2004 | Le et al. | |
| 2004/0242222 A1 | 12/2004 | An et al. | |
| 2004/0242228 A1 | 12/2004 | Lee et al. | |
| 2006/0099950 A1 * | 5/2006 | Klein et al. | 455/439 |
| 2007/0105555 A1 * | 5/2007 | Miernik et al. | 455/435.1 |

FOREIGN PATENT DOCUMENTS

| | | |
|---|---|---|
| EP | 0813346 | 12/1997 |
| EP | 1088463 | 4/2001 |
| JP | 2000/0125343 A | 4/2000 |
| JP | 2001/0217830 A | 8/2001 |
| KR | 20040004918 | 1/2004 |
| WO | 95/12297 | 5/1995 |
| WO | PCT/US98/47302 | 10/1998 |
| WO | WO/9847302 | 10/1998 |
| WO | WO 99/66748 | 12/1999 |
| WO | WO 01/58196 A1 | 8/2001 |
| WO | 0243409 | 5/2002 |

OTHER PUBLICATIONS

C Perkins, Editor "IP Mobility Support", Network Working Group, pp. 1-79 (Oct. 1996).

Li, Yalun "Protocol Architecture for Universal Personal Computing" IEEE Journal of Selected Areas in Communications 15(8): 1467-1476 (1997).

J. Moy, Editor "OSPF Version 2", Network Working Group, pp. 1-244 (Apr. 1998).

Valko, Andras "Cellular IP: A New Approach to Internet Host Mobility" Computer Communications Review 29(1): 50-65 (1999).

TIA/EIZ/IS-707A.8 "Data Service Options for Spread Spectrum Systems: Radio Link Protocol Type 2", pp. 1-1:4:2 (Mar. 1999).

IETF, Network Working Group, Request for Comments: 2205, Resource Reservation Protocol (RSVP)—Version 1 Functional Specification, pp. 1-105 (Sep. 1997).

IETF, Network Working Group, Request for Comments: 2206, RSVP Management Informatin Base Using SMIv2, pp. 1-60 (Sep. 1997).

IETF, Network Working Group, Request for Comments: 2207, RSVP Extension for IPSEC Data Flows, pp. 1-14 (Sep. 1997).

IETF, Network Working Group, Request for Comments: 2210, The Use of RSVP with IETF Integrated Services, pp. 1-31 (Sep. 1997).

IETF, Network Working Group, Request for Comments: 2208, Resource Reservation Protocol (RSVP) Version 1 Applicability Statement Some Guidelines on Deployment, pp. 1-6 (Sep. 1997).

IETF, Network Working Group, Request for Comments: 2209, Resource Reservation Protocol (RSVP)—Version 1 Message Processing Rules, pp. 1-24 (Sep. 1997).

Andras G. Valko, "Cellular IP—A New Approach to Internet Host Mobility," ACM Computer Communication Review, vol. 29, No. 1, pp. 50-65, Jan. 1999.

Karagiannis, Mobile IP, State of the Art Report, pp. 1-63, Jul. 1999.

Elin Wedlund et al., "Mobility Support Using SIP", Proc. Of ACM/IEEE International Conference on Wireless and Mobile Multimedia (WoWMoM '99), Seattle, Washington, Aug. 1999.

Henning Schulzrinne et al., "Application-Layer Mobility Using SIP", 0-7803-7133 IEEE, pp. 29-36, Jan. 2000.

IETF Network Working Group, Request for Comments: 2961, RSVP Refresh Overhead Reduction Extensions, pp. 1-32 (Apr. 2001).

Marshall, W., et al., Integration of Resource Management and SIP, IETF Internet Draft, draft-ietf-sip-manyfolks-resource-02.txt, Aug. 2001, pp. 1-28.

Andrew T. Campbell et al., "IP Micro-Mobility Protocols", ACM Sigmobile Mobile Computer and Communication Review (MC2R), vol. 4, No. 4, pp. 34-54, Oct. 2001.

S. Zhou et al., "A Location Management Scheme for Support Mobility In Wireless IP Networks Using Session Initiation Protocol (SIP)", 1531-2216/01 IEEE, Oct. 2001, pp. 486-491.

Bos, L., et al., A Framework for End-to-End Perceived Quality of Service Negotiation IETF Internet Draft, draft-bos-mmusic-sdpqos-framework-00.txt, Nov. 2001, pp. 1-22.

Papalilo, D., et al., Extending SIP for QoS Support www.coritel.it/publications/IP_download/papalilo-salsano-veltri.pdf, Dec. 8, 2001, pp. 1-6.

Camarillo, P., et al., Integration of Resource Management and SIP, IETF Internet Draft, draft-ietf-sip-manyfolks-resource-04.ps, Feb. 25, 2002 pp. 1-18.

Ho, Integration AAA with Mobile IPv4, Internet Draft, pp. 1-59, Apr. 2002.

"SIP: Session Initiation Protocol", IEFT Network Wording Group, Request for Comments: 3261, (Jun. 2002), pp. 1-29.

IETF, Network Working Group, Request for Comments: 3261 "SIP: Session Initiation Protocol", pp. 1-269 (printed as pp. 1-252) (Jun. 2002).

NetworkWorking Group, IPv6 Prefix Delegation Using ICMPv6, pp. 1-33, Apr. 2004.

IETF Mobile IP Working Group, "Mobility Support in IPv6", D. Johnson, Rice University, C. Perkins, Nokia Research Center, J. Arkko, Ericsson; Feb. 26, 2003, downloaded from http://www.join.uni-muenster.de on Dec. 29, 2004, pp. 1-158.

Network Working Group, "IP Mobility Support for IPv4", C. Perkins, Ed., Nokia Research Center, Jan. 2002, downloaded from http://www.ietf.org on Dec. 29, 2004, pp. 1-92.

"Source Specific Multicast (SSM) Explicit MultiCast (Xcast)," Copyright 2001 by ETRI, pp. 1-27.

\* cited by examiner

ENHANCED TECHNIQUES FOR USING CORE BASED NODES FOR STATE TRANSFER

RELATED APPLICATIONS

This application is a continuation-in-part of U.S. patent application Ser. No. 10/369,998, filed on Feb. 18, 2003 now U.S. Pat. No. 6,862,446, which claims the benefit of U.S. Provisional Patent Application Ser. No. 60/444,299, filed on Jan. 31, 2003, both of which are hereby expressly incorporated by reference.

BACKGROUND OF INVENTION

Communications system frequently include a plurality of network nodes which are coupled to access nodes through which end nodes, e.g., mobile devices, are coupled to the network. Network nodes may be arranged in a hierarchy. Access Authentication and Authorization (AAA) servers are nodes which are normally placed relatively high in the network hierarchy. They normally provide information used for security and access control purposes. Access nodes frequently have a secure link with an AAA server in cases where such servers are used. The secure link may be through one or more node in the hierarchy.

Operators typically manage access sessions in IP networks using the RADIUS protocol and associated RADIUS AAA servers. In the future, AAA systems may be based on new protocols such as DIAMETER. In a system using a RADIUS AAA server, when a user attempts to gain access to an operator network, for the duration of an access session, the local Access Router normally issues one or more RADIUS Access-Requests to an Authentication Server to authenticate that user based on its identity such as a Network Access Identifier (NAI). The AAA database typically has stored the identities of those users allowed to access its system along with the services features they are able to invoke. When the user is successfully authenticated, its access port on the access device is configured with policy state commensurate with the user's service Authorization. The service authorization is normally delivered via RADIUS to the Access Router by the Authorization Server. Whilst authorized, service usage during an access session is recorded by the Access Router, and sent as accounting records to an Accounting Server using Accounting-Request messages in the RADIUS protocol. The Accounting Server may be part of the AAA server or it may be an independent server using the same protocol with the authorization server. If the user is connected to multiple Access Routers during a single session then the multiple sessions need to be aggregated in the Accounting Servers.

In addition to authorization and accounting issues, communications systems which support mobile devices need to include mechanisms for conveying location information so that a mobile device can change its point of attachment to the network and still have signals, e.g., IP packets, routed to it.

Mobile IP, (versions 4 and 6) also known as MIPv4 [MIPv4] and MIPv6 [MIPv6], enables a mobile node (MN) to register its temporary location indicated by a care-of-address (CoA) to its Home Agent (HA). The HA then keeps a mapping (also called a binding) between the MN's permanent address, otherwise called Home Address (HoA), and the registered CoA so that packets for that MN can be redirected to its current location using IP encapsulation techniques (tunneling). The CoA used by a MN can be an address that belongs to a Foreign Agent (FA) in an Access Router when MIPv4 is used or it can be a temporarily allocated address to the MN itself, from the Access Router prefix, in which case it is called a collocated care-of-address (CCoA). The latter model also applies to MIPv4 while it is the only mode of operation in MIPv6. Note that for the purpose of this document the terms CCoA and CoA as well as Registration and Binding Update (BU) are interchangeable since they are the corresponding terms for MIPv4 and MIPv6. The methods and apparatus of the invention are applicable to both MIPv4 and MIPv6 unless otherwise mentioned.

AAA systems are typically used with mobile IP to manage IP address allocations (HoAs), to dynamically allocate HAs, to distribute MN profiles to the Access Router and also to distribute security keys to authenticate MIP messages and to secure the air-link. The Mobile Node, an end node which is capable of changing its point of network attachment, typically sends a MIP message to gain access to the system, which triggers a AAA request to authenticate and authorize the Mobile Node. The AAA MN profile and security state is then passed from the AAA system to the Access Router to control services consumed by the MN.

MNs may change their point of network attachment, e.g., as they move from one cell to another cell. This involves changing the MNs point of attachment from a first access node, e.g., a first router, to a second access node, e.g., a second router. This process is commonly known as a handoff. As part of a handoff the MN's CoA/CCoA needs to be updated and then transferred into the HA using MIP signaling so that packets are redirected to the MN via the new Access Router. As part of handoff process, it is necessary to transfer at least some of the first access router's state information corresponding to the MN involved in the handoff to the new access router so that the MN service is not interrupted. This process is known as State Transfer. State transfer may include, e.g., the transfer of AAA profile state information that was previously delivered via RADIUS to the AR, at which the MN access session commenced. It also may include, e.g., the transfer of air-link security vectors, MN-NAI, MN IP Address, MN-EUI-64, remaining MIP Registration Lifetime, MN multicast group membership, admission control state, resource reservation state, diff-serv state, SIP session state, compressor state, MN scheduling history and/or many other potential items of MN specific AR state information.

In at least one known system, the transfer of state information during a handoff is accomplished by the new access node to which a mobile node is connecting sending a state transfer message through the communications network to the old access node to which the mobile node was connected. In response the old access node forwards state information to the new access node. This technique, while effective, has the disadvantage of requiring that a message be sent between the old and new access nodes to initiate the transfer of the state information. The links between access nodes used for the transmission of such messages may become congested or could be used to convey other information and/or signals if the need for messages between access nodes used to initiate the transfer of state information could be eliminated.

In view of the above discussion, it should be appreciated that there is a need for new methods of implementing the communication of state information to a new access node in the case of a mobile node handoff or in other cases where a mobile node enters a new cell. It should also be appreciated that, for the reasons discussed above, avoiding the use of messages between access nodes to trigger the transfer of state information during a handoff is desirable.

SUMMARY OF THE INVENTION

In a wireless network, mobile end users use end nodes, e.g., wireless devices, to communicate with other network entities, e.g., wireless devices used by other end users, via access nodes. The access nodes may be implemented as wireless access routers. Associated with each end node there is state, e.g., a set of information comprising various parameters relating to service(s) and/or application(s) corresponding to the end node. This state is used by an access router which serves as the end node's point of network attachment. Each time the end node changes the point of attachment to the network, the state needs to be re-built or transferred to the access router which serves as the new point of network attachment so that the new access node can continue to provide communication services with regard to existing communications sessions or provide new communications services, e.g., as requested by the end node. This document describes the concept of state transfer between access points/routers as well as a novel way to gather the required state and transfer it from one point to the next.

This application describes methods for transfer of state to support events such as the movement of an end node (EN) between access nodes (ANs). The method uses Core State Management Nodes (CSMNs) located in the core of the network, to store, process and forward state information for the end nodes. The CSMNs used to store and transfer state information in accordance with the invention may be implemented as part of Authentication Authorization & Accounting (AAA) server similar to the type found in many systems.

In accordance with one feature of the invention, access nodes can store state information in a CSMN and can also retrieve, e.g., fetch, state corresponding to an end node from the CSMN used to store that information. Access nodes normally update the stored state for an end node for which they serve as the network point of attachment when the end node signals an intent to end communication with the access node or communication ceases, e.g., because communication with the access node is interrupted or terminated prior to completion of a handoff operation.

An access node normally retrieves state information from the CSMN when communication with an end node is initiated, e.g., when the end node enters the cell corresponding to the access node. However, in the case of a handoff, in some embodiments, state information is forwarded from the access node which was previously servicing the end node eliminating the need to retrieve state information from the CSMN.

In accordance with one feature of the invention, during handoff, the mobile node controls the forwarding of state from the first to the second access node being used by the end node. This is accomplished by the end node sending a message to the first access node to forward state information to the second access node. This approach avoids the need for the second node to send a message to the first node requesting the transfer of state information thereby reducing the amount of signaling between access nodes as compared to system which employ such state transfer messages between access nodes.

In cases where communication is lost with the first access node before the end node can transmit the state transfer signal, the second access node will retrieve the state information from the CSMN. Use of the transfer message is optional but has the advantage of reducing the number of information retrieval operations which need to be supported by the core node. In addition, the use of the transfer message directed from the end node to the first access node has the advantage of reducing delays in terms of the amount of time between when the end node begins communication with the second access node and when the second access node obtains the state information to be used in servicing the end node. The state transfer message may trigger updating of the state information in the core node in addition to the transfer of state information to the second access node.

State information stored by an access node in the CSMN and/or transferred to another access node will normally reflect any local changes to that state, e.g., changes made at the access node which is storing or transferring the state subsequent to the state information being received either from the CSMN or another access node. Stored state may also be manipulated and modified by the CSMN itself, e.g., as system or session requirements change during an end node access session or other communication operation.

Additional features and benefits of the present invention are discussed in the detailed description which follows.

BRIEF DESCRIPTION OF THE DRAWINGS

FIG. 13 illustrates signaling which can be used to perform a handoff process, the handoff being initiated by signals communicated by an end node through a first access node to a second access node which the end node intends to establish a communications link with.

DETAILED DESCRIPTION

The methods and apparatus of the present invention for storing, manipulating, retrieving, and forwarding state, e.g., context and other information, used to support communications sessions with one or more end nodes, e.g., mobile devices, can be used with a wide range of communications systems. For example the invention can be used with systems which support mobile communications devices such as notebook computers equipped with modems, PDAs, and a wide variety of other devices which support wireless interfaces in the interests of device mobility.

Figure 1:
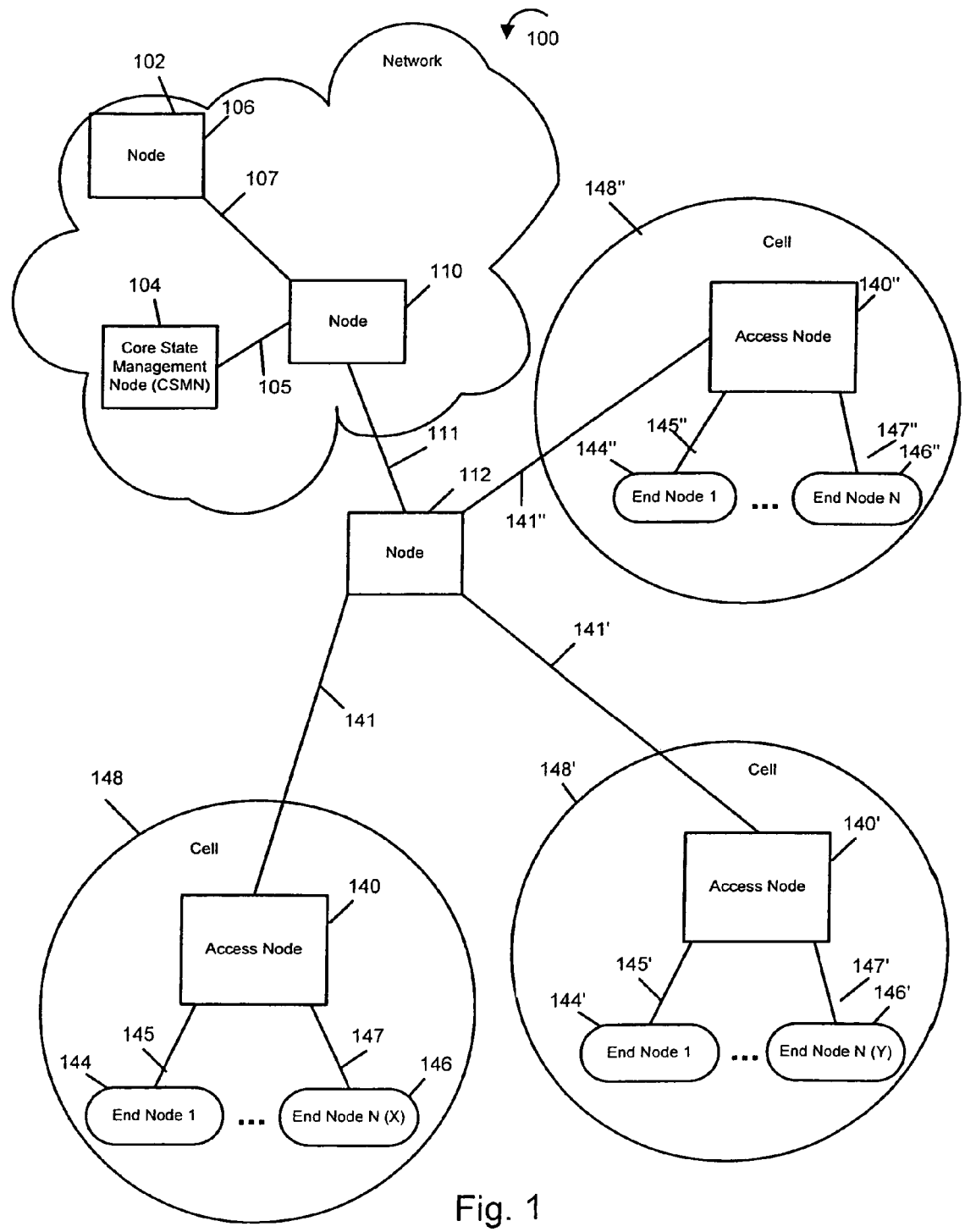
FIG. 1 illustrates a network diagram of an exemplary communications system in which the invention is applicable.

FIG. 1 illustrates an exemplary communication system 100, e.g., a cellular communication network, which comprises a plurality of nodes interconnected by communications links. Nodes in the exemplary communication system 100 exchange information using signals, e.g., messages, based on communication protocols, e.g., the Internet Protocol (IP). The communications links of the system 100 may be implemented, for example, using wires, fiber optic cables, and/or wireless communications techniques. The exemplary communication system 100 includes a plurality of end nodes 144, 146, 144', 146', 144", 146", which access the communication system via a plurality of access nodes 140, 140', 140". The end nodes 144, 146, 144', 146', 144", 146" may be, e.g., wireless communication devices or terminals, and the access nodes 140, 140', 140" may be, e.g., wireless access routers or base stations. The exemplary communication system 100 also includes a number of other nodes 104, 106, 110, and 112, used to provide interconnectivity or to provide specific services or functions. Specifically, the exemplary communication system 100 includes a Core State Management node (CSMN) 104, used to support transfer and storage of state pertaining to end nodes. The CSMN node may be part of an AAA server.

The FIG. 1 exemplary system 100 depicts a network 102 that includes the CSMN 104 and the node 106, both of which are connected to an intermediate network node 110 by a corresponding network link 105 and 107, respectively. The intermediate network node 110 in the network 102 also provides interconnectivity to network nodes that are external from the perspective of the network 102 via network link 111. Network link 111 is connected to another intermediate network node 112, which provides further connectivity to a plurality of access nodes 140, 140', 140" via network links 141, 141', 141", respectively.

Each access node 140, 140', 140" is depicted as providing connectivity to a plurality of N end nodes (144, 146), (144', 146'), (144", 146"), respectively, via corresponding access links (145, 147), (145', 147'), (145", 147"), respectively. In the exemplary communication system 100, each access node 140, 140', 140" is depicted as using wireless technology, e.g., wireless access links, to provide access. A radio coverage area, e.g., communications cell, 148, 148', 148" of each access node 140, 140', 140", respectively, is illustrated as a circle surrounding the corresponding access node.

The exemplary communication system 100 is subsequently used as a basis for the description of various embodiments of the invention. Alternative embodiments of the invention include various network topologies, where the number and type of network nodes, the number and type of access nodes, the number and type of end nodes, the number and type of CSMNs, the number and type of links, and the interconnectivity between nodes may differ from that of the exemplary communication system 100 depicted in FIG. 1.

In various embodiments of the present invention some of the functional entities depicted in FIG. 1 may be omitted or combined. The location or placement of these functional entities in the network may also be varied.

Figure 2:
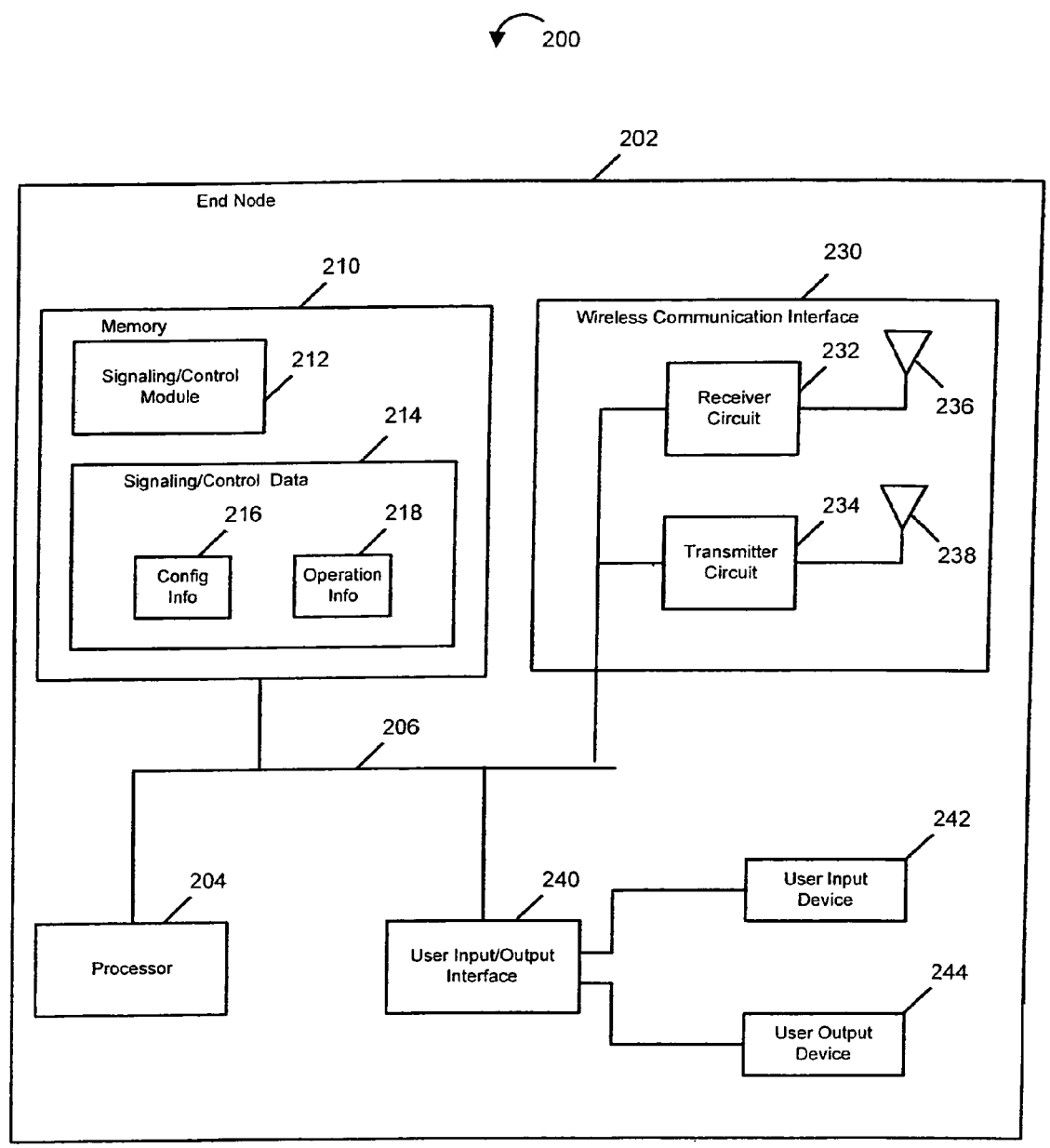
FIG. 2 illustrates an exemplary end node implemented in accordance with the present invention.

FIG. 2 provides a detailed illustration of an exemplary end node 200 implemented in accordance with the present invention. The exemplary end node 200, depicted in FIG. 2, is a detailed representation of an apparatus that may be used as any one of the end nodes 144, 146, 144', 146', 144", 146", depicted in FIG. 1. In the FIG. 2 embodiment, the end node 200 includes a processor 204, a wireless communication interface 230, a user input/output interface 240 and memory 210 coupled together by bus 206. Accordingly, via bus 206 the various components of the end node 200 can exchange information, signals and data. The components 204, 206, 210, 230, 240 of the end node 200 are located inside a housing 202.

The wireless communication interface 230 provides a mechanism by which the internal components of the end node 200 can send and receive signals to/from external devices and network nodes, e.g., access nodes. The wireless communication interface 230 includes, e.g., a receiver circuit 232 with a corresponding receiving antenna 236 and a transmitter circuit 234 with a corresponding transmitting antenna 238 used for coupling the end node 200 to other network nodes, e.g., via wireless communications channels.

The exemplary end node 200 also includes a user input device 242, e.g., keypad, and a user output device 244, e.g., display, which are coupled to bus 206 via the user input/output interface 240. Thus, user input/output devices 242, 244 can exchange information, signals and data with other components of the end node 200 via user input/output interface 240 and bus 206. The user input/output interface 240 and associated devices 242, 244 provide a mechanism by which a user can operate the end node 200 to accomplish various tasks. In particular, the user input device 242 and user output device 244 provide the functionality that allows a user to control the end node 200 and applications, e.g., modules, programs, routines and/or functions, that execute in the memory 210 of the end node 200.

The processor 204 under control of various modules, e.g., routines, included in memory 210 controls operation of the end node 200 to perform various signaling and processing as discussed below. The modules included in memory 210 are executed on startup or as called by other modules. Modules may exchange data, information, and signals when executed. Modules may also share data and information when executed. In the FIG. 2 embodiment, the memory 210 of end node 200 of the present invention includes a signaling/control module 212 and signaling/control data 214.

The signaling/control module 212 controls processing relating to receiving and sending signals, e.g., messages, for management of state information storage, retrieval, and processing. Signaling/control data 214 includes state information, e.g., parameters, status and/or other information relating to operation of the end node. In particular, the signaling/control data 214 may include configuration information 216, e.g., end node identification information, and operational information 218, e.g., information about current processing state, status of pending responses, etc. The module 212 may access and/or modify the data 214, e.g., update the configuration information 216 and/or the operational information 218.

Figure 3:
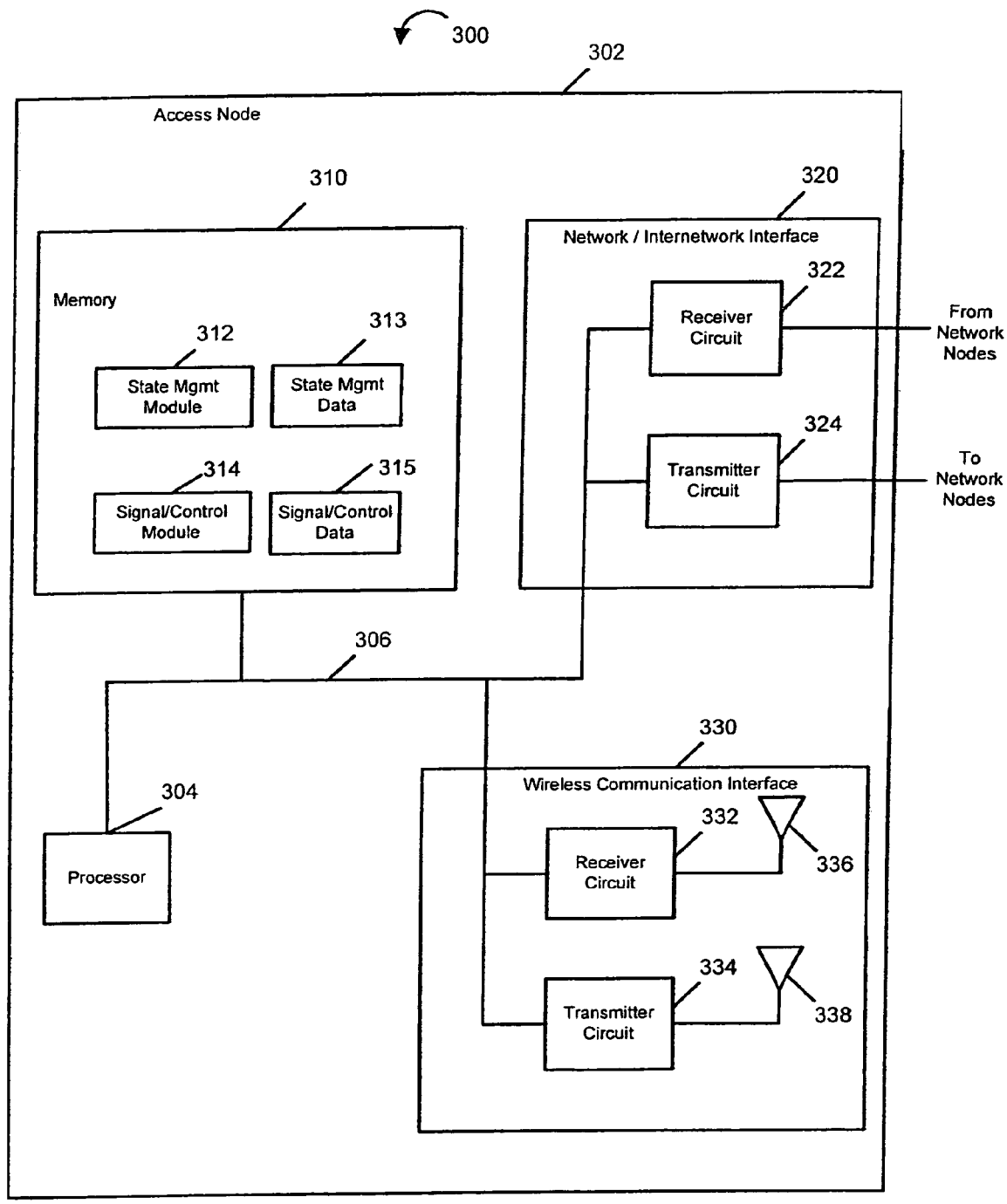
FIG. 3 illustrates an exemplary access node implemented in accordance with the present invention.

FIG. 3 provides a detailed illustration of an exemplary access node 300 implemented in accordance with the present invention. The exemplary access node 300, depicted in FIG. 3, is a detailed representation of an apparatus that may be used as any one of the access nodes 140, 140', 140" depicted in FIG. 1. In the FIG. 3 embodiment, the access node 300 includes a processor 304, memory 310, a network/internetwork interface 320 and a wireless communication interface 330, coupled together by bus 306. Accordingly, via bus 306 the various components of the access node 300 can exchange information, signals and data. The components 304, 306, 310, 320, 330 of the access node 300 are located inside a housing 302.

The network/internetwork interface 320 provides a mechanism by which the internal components of the access node 300 can send and receive signals to/from external devices and network nodes. The network/internetwork interface 320 includes, a receiver circuit 322 and a transmitter circuit 324 used for coupling the node 300 to other network nodes, e.g., via copper wires or fiber optic lines. The wireless communication interface 330 also provides a mechanism by which the internal components of the access node 300 can send and receive signals to/from external devices and network nodes, e.g., end nodes. The wireless communication interface 330 includes, e.g., a receiver circuit 332 with a corresponding receiving antenna 336 and a transmitter circuit 334 with a corresponding transmitting antenna 338. The interface 330 is used for coupling the access node 300 to other network nodes, e.g., via wireless communication channels.

The processor 304 under control of various modules, e.g., routines, included in memory 310 controls operation of the access node 300 to perform various signaling and processing. The modules included in memory 310 is executed on startup or as called by other modules that may be present in memory 310. Modules may exchange data, information, and signals when executed. Modules may also share data and information when executed. In the FIG. 3 embodiment, the memory 310 of the access node 300 of the present invention includes a State Management module 312 and a Signaling/Control module 314. Corresponding to each of these modules, memory 310 also includes State Management data 313 and the Signaling/Control data 315.

The State Management Module 312 controls the processing of received signals from end nodes or other network nodes regarding state storage and retrieval. The State Management Data 313 includes, e.g., end-node related information such as the state or part of the state, or the location of the current end node state if stored in some other network node. The State Management module 312 may access and/or modify the State Management data 313.

The Signaling/Control module 314 controls the processing of signals to/from end nodes over the wireless communication interface 330, and to/from other network nodes over the network/internetwork interface 320, as necessary for other operations such as basic wireless function, network management, etc. The Signaling/Control data 315 includes, e.g., end-node related data regarding wireless channel assignment for basic operation, and other network-related data such as the address of support/management servers, configuration information for basic network communications. The Signaling/Control module 314 may access and/or modify the Signaling/Control data 315.

Figure 4:
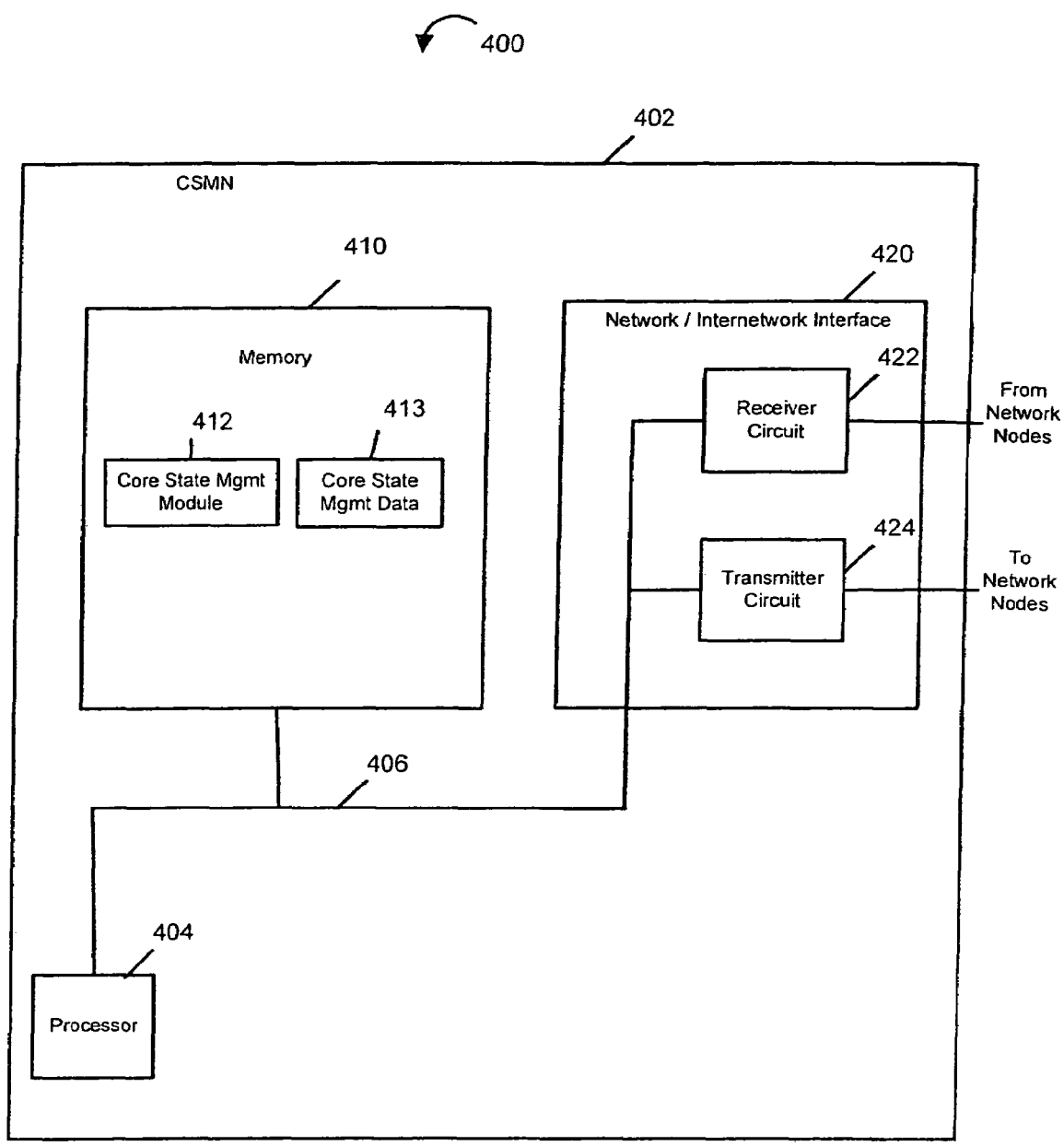
FIG. 4 illustrates an exemplary Core State Management Node implemented in accordance with the present invention.

FIG. 4 provides a detailed illustration of an exemplary Core State Management Node 400 implemented in accordance with the present invention. The exemplary CSMN 400, depicted in FIG. 4, is a detailed representation of an apparatus that may be used as the CSMN 104 depicted in FIG. 1. In the FIG. 4 embodiment, the CSMN 400 includes a processor 404, memory 410, a network/internetwork interface 420, coupled together by bus 406. Accordingly, via bus 406 the various components of the access node 400 can exchange information, signals and data. The components 404, 406, 410, 420 of the access node 400 are located inside a housing 402.

The network/internetwork interface 420 provides a mechanism by which the internal components of the CSMN 400 can send and receive signals to/from external devices and network nodes. The network/internetwork interface 420 includes, a receiver circuit 422 and a transmitter circuit 424 used for coupling the node 400 to other network nodes, e.g., via copper wires or fiber optic lines.

The processor 404 under control of various modules, e.g., routines, included in memory 410 controls operation of the CSMN 400 to perform various signaling and processing. The module included in memory 410 is executed on startup or as called by other modules that may be present in memory 410. In the FIG. 4 embodiment, the memory 410 of the CSMN 400 of the present invention includes a Core State Management module 412 and a Core State Management data 413.

The Core State Management Module 412 controls the processing of received signals from other CSMN, access nodes, or network nodes regarding state storage and retrieval. The Core State Management Data 413 includes, e.g., end-node state information. The Core State Management module 412 may access and/or modify the Core State Management data 413.

FIGS. 5, 6, 7 and 8 illustrate the signaling performed in accordance with an exemplary embodiment of the invention. The signaling is illustrated in the context of exemplary system 500, adapted from system 100 illustrated in FIG. 1. Each of the access nodes 140, 140' shown in FIGS. 5, 6, 7 and 8 are simplified representations of the exemplary access node 300 depicted in FIG. 3. Additionally, in the exemplary system 500 the end nodes 144, 146, 144', 146', 144", 146" (and corresponding access links 145, 147, 145', 147', 145", 147") from system 100 have been replaced for purposes of explaining the invention with a single end node, X 146, implemented in accordance with the invention. End node, X, 146 shown in FIGS. 5, 6, 7 and 8 is a simplified representation of end node 200 depicted in FIG. 2 and is coupled to the depicted access nodes by one or more wireless communications links.

End node state information transferred between access nodes and core state management nodes in accordance with the present invention is state information relating to, e.g., used to support, communication with the end node which operates as part of the system. In one embodiment of this invention transferred state information will typically include static, long lived and short lived components. Static components may include parameters that do not change over long periods of time and multiple communication sessions. Examples of static state are end node profile information such as general quality of service parameters (e.g.: peak rates allowed) and generic authorization state (e.g.: type of data calls allowed). Examples of long lived state are parameters that do not change during the duration of a communication session (e.g.: a dynamically assigned Internet address or some long lived security information). Examples of short lived state are parameters that are very dynamic in nature and change multiple times during a communications session (e.g.: dynamic quality of service state, multicast group membership, etc.)

In one embodiment of this invention state information (static, short and long lived) is moved together according to methods described in the present invention. In an alternative embodiment static state resides permanently in CSMNs. In this case both static and dynamic state may be transferred between CSMNs located in different regions, or from CSMN to access nodes. However, while dynamic state information is normally transferred from access nodes to CSMNs, there is no need to communicate static state information to the CSMNs since they already include the information. In an alternative embodiment, all state resides in one or more CSMNs and access nodes and/or CSMNs may update said state as state changes occur.

CSMN Operation

Figure 5:
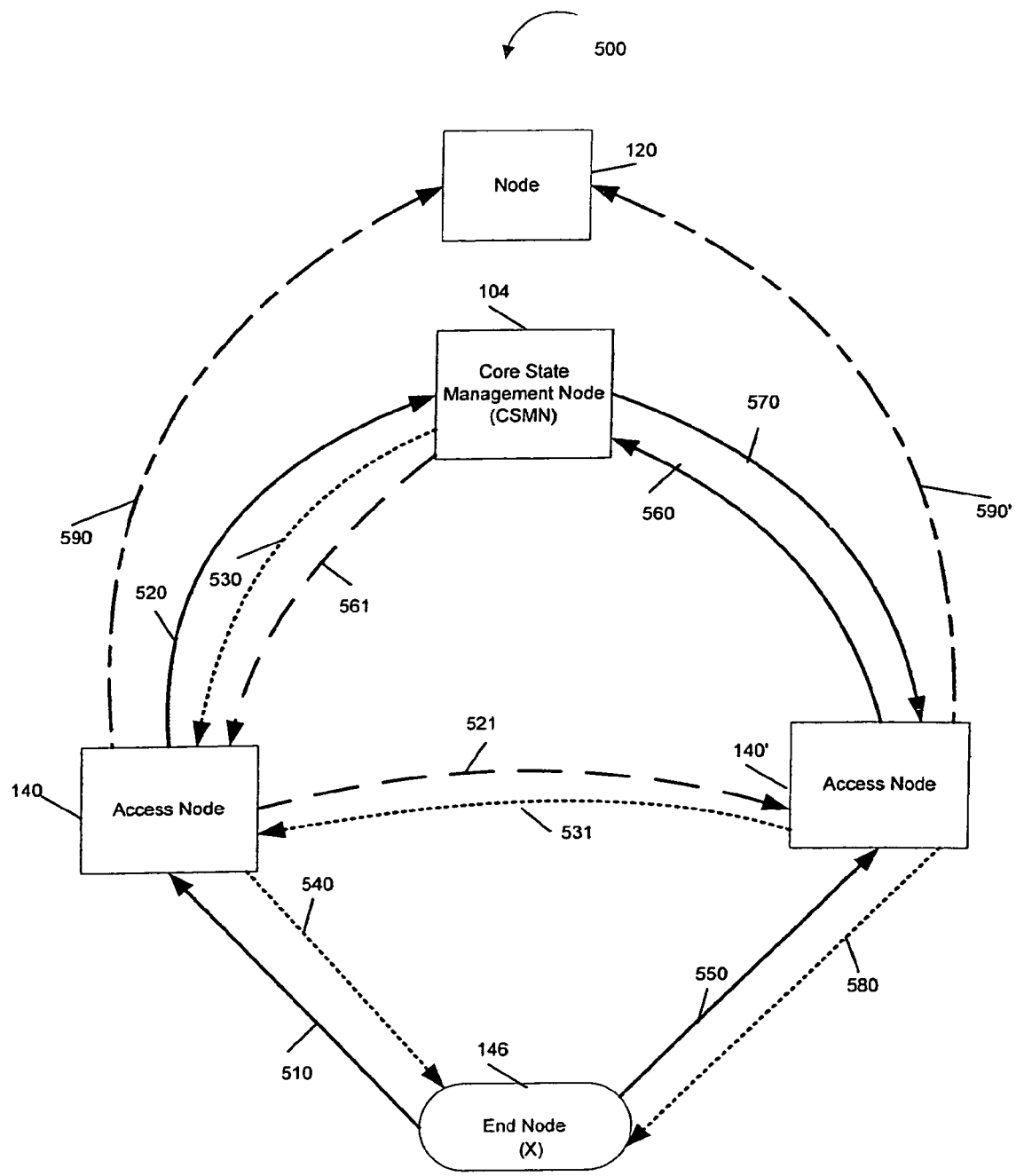
FIG. 5 illustrates signaling performed in accordance with the present invention when an end node transitions from one access node to another access node.

CSMN operation in accordance with one feature of the invention will now be described with reference to FIG. 5. FIG. 5 illustrates core state management signaling in a simplified version of the exemplary system depicted in the FIG. 1 and described above. The depicted signaling may occur as part of a handoff operation. FIG. 5 includes access nodes 140, 140' implemented according to FIG. 3, end node X 146 implemented according to FIG. 2 and a Core State Management Node (CSMN) 104 implemented according to FIG. 4. Lines between the nodes of FIG. 5 represent state management related messages sent and received according to the present invention and are explained below. Dashed lines between nodes of FIG. 5 indicate optional messages.

In FIG. 5 End Node X 146 sends, e.g., at the start of a handoff, a Store State Request (SSRQ) message 510 to Access Node 140 comprising the End Node X 146 identifier. An end node identifier may be a network address, hardware address, or other identification specific to the user or the device associated with the end node. On reception of the SSRQ message 510 the Access Node 140 searches its State Management data 313 (FIG. 3) for state information associated with said end node and sends a Access Node State Transfer Update (AN-STU) message 520 to the Core State Management Node (CSMN) 104.

In addition to, or as an alternative to being triggered by a SSRQ message 510 from an end node, the Access node can monitor for the receipt of wide range of signals that will result in a change in state corresponding to an end node 146 and, in response to such signals or in response to some change in state that is not triggered by a received signal, the access node 140 will generate a state update message 520 which is sent to the CSMN 104. Thus, in such embodiments, when state corresponding to an end node changes at the access node 140, the CSMN 104 will be promptly updated. This approach of triggering state update messages 520 is particularly useful where state changes occur due to signals and/or internal access node operations which the end node 146 may not be aware of. While this method of triggering state updates at the access node 140 has been described in the context of the FIG. 5 embodiment, such triggering of state update messages at an access node, e.g., due to a received signal or due to a state change within an access node, may and in some embodiments does occur in the same or similar manner in the embodiments shown in FIGS. 6, 7 and 8 which are discussed further below.

The state update message, AN-STU message 520 comprises the End Node X 146 identifier and state associated with said end node as available to Access Node 140. As will be discussed further below, in various embodiments it also includes an Access Node identifier which identifies the access node sending the state update message. It may also include one or more of an Access Node independent count value such as a time stamp which is access node independent and can be interpreted without knowledge of the access node sending the time stamp and an access node dependent count. Given the difficulty in generating an access node independent count in a highly precise manner, e.g., due to the problem of synchronizing different elements in the system at a very fine level down to the time that two sequential state update messages may be sent from an access node, the access node independent count may be incremented on a slower time scale than the access node dependent count. The access node dependent count is incremented at a rate sufficient to distinguish between state update messages generated by an individual access node. If the access node independent count can be incremented at such a rate, the access node dependent count need not be used. However, by using the two counts in combination, a highly reliable decision can be made as to whether a received message includes state which is newer than a stored message. This reliability is due in part to the fact that mobile devices often switch between end nodes at a rate which is comparatively slower than the rate at which state update messages may be generated at an access node, e.g., due to repeated changes in service and/or service requests made by the end node.

On reception of the AN-STU message 520 the Core State Management Module 412 (FIG. 4) of CSMN Node 104 processes the message and stores the state included in said message in its CSM data 413 (FIG. 4), assuming it is more recent than state already included the CSM date 413 for the end node, such that said state is associated with the identifier of the end node also included in said message. CSMN node 104 optionally returns a State transfer Update Acknowledgement (STUAck) message 530 to Access Node 140 indicating the correct reception and storage of said state. Access Node 140 on reception of STUAck message 530 optionally sends a Store State Reply (SSRP) message 540 to End Node X 146 indicating the successful storage of said state in the core.

End Node X 146 sends a Retrieve State Request (RSRQ) message 550 to Access Node 140' comprising the End Node X 146 identifier. On reception of said RSRQ message 550 Access Node 140' sends a State Transfer Request (STRQ) message 560 comprising the identifier of End Node X 146 to CSMN node 104. On reception of said STRQ message 560, the Core State Management module 412 (FIG. 4) of CSMN node 104 processes said message and searches its core state management data 413 for state associated with the End Node X 146 indicated in said STRQ message. State associated with End Node X 146 that was earlier stored is found and a CSMN State Transfer Update (CSMN-STU) message 570 including said state and the identifier of End Node X 146 is sent to Access Node 140'. On reception of CSMN-STU message 570, Access Node 140' stores state included in said message in its state management data 313 (FIG. 3). Access Node 140' optionally sends a Retrieve State Reply (RSRP) message 580 to End Node X 146 to indicate the correct retrieval of state associated with said end node from the core.

In an alternative embodiment of this invention the SSRQ message 510 additionally includes the identifier of Access Node 140' that End Node X 146 wishes to exchange data with. In that case Access Node 140 sends an additional copy of the AN-STU message 520 to the Access Node 140' as indicated by AN-STU message 521. Access Node 140' receives said message and stores state included in said message and associated with said end node. In this embodiment of the invention when Access Node 140' receives RSRQ message 550 it first checks its state management data 313 (FIG. 3) for state associated with said end node and only sends STRQ message 560 if no state is found. In the same embodiment Access Node 140' may optionally send a STUAck message 531 to Access Node 140 on reception of the AN-STU message 521.

In the various embodiments described above in regard to FIG. 5, after sate information is transferred to the second access node 140', network routing information corresponding to end node x 146 is updated so that IP packets and other signals intended for end node X 146 will be directed to the second access node 140' instead of the first access node 140. This is accomplished by one of the first and second access nodes 140, 140' sending a routing message to one or more network routing devices. In the FIG. 5 example, node 120 is used to represent a routing device, e.g., a router, while messages 590 and 590' represent routing update messages transmitted by the first and second access nodes 140, 140' respectively. Normally, only one of the access nodes will be responsible for transmitting the routing update message. In most embodiments this will be the second access node 140' which transmits the message 590' once the state corresponding to end node X 146 has been successfully received.

Removal of State from CSMN

State may be removed from the CSMN, e.g., upon expiration of a timer. State may also be removed by overwriting it with more recent state corresponding to the same end node as the state being overwritten such overwriting will result in resetting of the time associated with the stored state. In one embodiment of this invention, on reception of AN-STU message 520, the CSMN 104, in addition to the processing described in the previous two sections, starts a timer of predetermined or negotiated value and associates said timer with the state included in the received message 520 and stored in its core state management data 413 (FIG. 4). When said timer expires, state associated with that timer, and corresponding to an end node, is removed from the core state management data 413 (FIG. 4) of CSMN node 104. Removal of end node state upon timer expiration does not depend on whether or not this state was requested through a STRQ message while the timer was valid. Furthermore, if while the timer is still valid, the CSMN receives another AN-STU message, from the same or different access node, comprising state for the same End Node X, then the CSMN re-sets the timer to its original value. Resetting the timer is done whether or not the updated state is actually the same or differs from the existing stored state.

State Unavailable

In some cases, requested state information may not be available in the CSMN. In one embodiment of this invention, if no state is available for the end node indicated in a received STRQ message 560, the CSMN 104 returns a CSMN-STU message 570 including an indication that no state is available for said end node. In an alternative embodiment of this invention if no state is available for the end node indicated in a received STRQ message 560, the CSMN 104 starts a predetermined or negotiated timer and associates it with said message 560. If state for the end node identified in message 560 is received, say in a AN-STU message 520, prior to the timer expiring, the CSMN processes message 520 as described earlier and immediately stops the timer and sends a CSMN-STU message 570 to Access Node 140'. If the timer expires and no appropriate state is received then the CSMN node 104 returns a CSMN-STU message 570 including an indication that no state is available for said end node. In a third embodiment of this invention if no state is available for the end node indicated in a received STRQ message 560, the CSMN 104 sends an optional Transfer State Request (TSRQ) message 561, comprising the identifier of End Node X 146 and the identifier of Access Node 140' that is currently requesting state, to the last access node that requested state for said end node X 146, i.e.: Access Node 140. In this case Access Node 140 sends the AN-STU message 521 to the Access Node 140' as indicated in FIG. 5. On reception of AN-STU message 521, Access Node 140' stores state included in said message in its state management data 313 (FIG. 3) and optionally returns acknowledgment message 531 to Access Node 140.

State Updates

In one embodiment of this invention state information included in an AN-STU message 520, received by CSMN node 104 overwrites any existing state information in the core state management data 413 (FIG. 4) of CSMN node 104. In an alternative embodiment of this invention multiple versions of state associated with a single end node are maintained in the CSMN 104, and only removed on expiration of associated timers or other triggers such as explicit messages from other network nodes. Various other embodiments which involve a decision to update state based on one or more count values included in a AN-STU message 520 are discussed below, e.g. in regard to FIG. 14.

State Manipulation at CSMN

In one embodiment of this invention the CSMN modifies state associated with an end node according to local policy before it sends it to a requesting access node in a CSMN-STU message 570.

State Indication from AN to EN

In one embodiment of this invention the RSRP message 580 from access node 140' includes an indication of the state received by the access node in a corresponding CSMN-STU message 570. In one embodiment of this invention the indication provided is a digest which allows the end node to compare the received digest with a digest of the state it had at the access node 140, and to recognize whether the state is correct or not. In cases where the end node knows that the state should match or should differ from the one stored through access node 140, the end node can take further action according to fault detection policies.

Loss of Link

In one embodiment of the present invention, Access Node 140 sends the AN-STU message 520 as soon as it detects the loss of connectivity with End Node X 146.

Core State Management Between Regions: Reactive Approach

Figure 6:
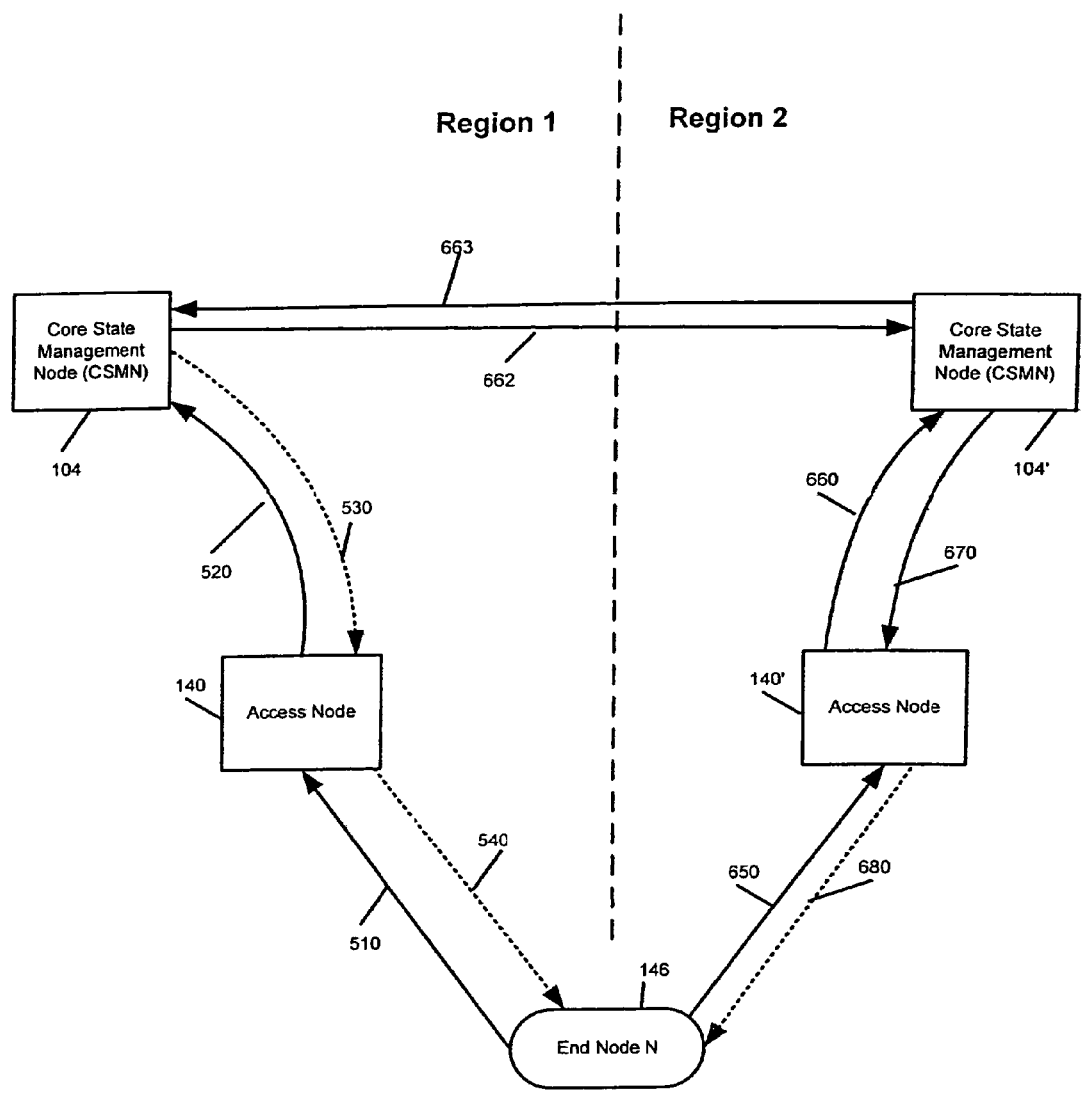
FIG. 6 illustrates signaling performed in accordance with the present invention when an end node transitions from one access node to another access node when the access nodes use different CSMN nodes.

FIG. 6 depicts an alternative embodiment of the invention in which Access Nodes 140 and 140' belong to different regions and thus store and retrieve state from different CSMN Nodes 104 and 104' respectively. In this invention the term "region" is used to identify a multitude of access nodes using the same CSMN node to store and retrieve state from/to. The breakdown of a large network into CSMN regions facilitates the scaling of state transfer methods described in this invention.

In FIG. 6 the processing and content of messages 510, 520, 530, 540 is identical to that in FIG. 5 and thus are not described again here. Messages 650, 660, 670 and 680 are variations to corresponding messages 550, 560, 570 and 580 in FIG. 5 and thus are described below together with new messages 662, 663.

State associated with End Node X 146 is stored in CSMN node 104 with the method described in FIG. 5 and messages 510, 520, 530 and 540. Following that, in this embodiment of the present invention End Node X 146 sends Retrieve State Request (RSRQ) message 650 to Access Node 140' including the End Node X 146 identifier and Region ID of the region of which Access Node 140 is a member. On reception of said RSRQ message 650 Access Node 140' sends State Transfer Request (STRQ) message 660 including the identifier of End Node X 146 and the Access Node 140 Region ID to CSMN node 104'. On reception of said STRQ message 660, the core state management module 412 (FIG. 4) of CSMN node 104' processes said message and searches its core state management data 413 for state associated with the End Node X 146 indicated in said message. State associated with End Node X 146 is not found and thus the CSMN node 104' sends Core State Transfer Request (Core-STRQ) message 663, comprising the identifier of End Node x 146, to CSMN node 104, which is the CSMN node for the Region ID indicated in message 660.

On reception of said Core-STRQ message 663, the Core State Management module 412 (FIG. 4) of CSMN node 104 processes said message and searches its Core State Management data 413 for state associated with the End Node X 146 indicated in said message. State associated with End Node X 146 that was earlier stored is found and a Core State Transfer Update (Core-STU) message 662 including said state and the identifier of End Node X 146 is sent to CSMN Node 104'. On reception of Core-STU message 662, CSMN Node 104' stores state included in said message in its Core State Management data 413 (FIG. 4) and sends CSMN-STU message 670, including state associated with End Node X 146, to the requesting Access Node 140'. On reception of CSMN-STU message 670, Access Node 140' stores state included in said message in its state management data 313 (FIG. 3). Access Node 140' optionally sends Retrieve State Reply (RSRP) message 680 to indicate the correct retrieval of state associated with said end node from the core.

Region ID to CSMN Mapping

In one embodiment of this invention the Region ID referred to above identifies the CSMN node of the same region. In an alternative embodiment of this invention the Region ID is of a structure that allows the resolution of that ID to an ID that identifies the CSMN Node of that Region.

Core State Management Between Regions: Proactive

Figure 7:
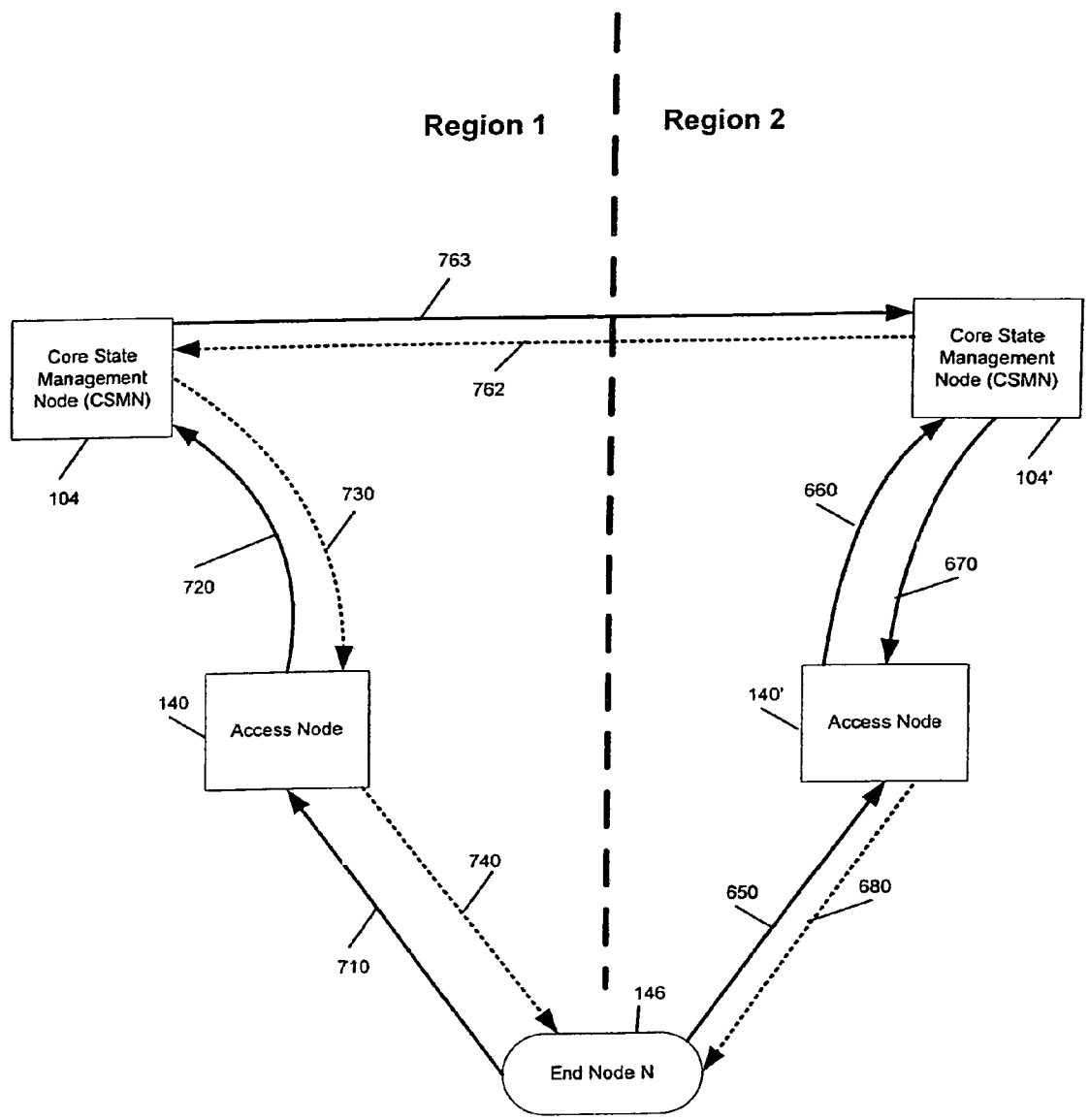
FIG. 7 illustrates alternative signaling performed from FIG. 6.

FIG. 7 depicts an alternative method from that described in FIG. 6. In FIG. 7 End Node X 146 sends Store State Request (SSRQ) message 710 to Access Node 140 including the End Node X 146 identifier and the Region ID corresponding to Access Node 140'. On reception of SSRQ message 710 the Access Node 140 searches its state management data 313 (FIG. 3) for state associated with said end node and sends a Access Node State Transfer Update (AN-STU) message 720 to the Core State Management Node (CSMN) 104. Said AN-STU message 720 includes the End Node X 146 identifier, the state associated with said end node as available to Access Node 140, and the Region ID that was included in SSRQ message 710.

On reception of AN-STU message 720, the core state management module 412 (FIG. 4) of CSMN Node 104 processes the message, stores the state included in said message in its core state management data 413 (FIG. 4) such that said state is associated with the identifier of the end node also included in said AN-STU message 720. CSMN Node 104 also observes the Region ID in message 720 and thus sends a Core-STU message 763 to CSMN node 104' which is the CSMN of the region associated with said Region ID. CSMN node 104' optionally returns Core State Transfer Update Acknowledgement (Core-STUAck) message 762 to CSMN Node 104 indicating the correct reception and storage of said state. CSMN node 104 also optionally returns State transfer Update Acknowledgement (STUAck) message 730 to Access Node 140 indicating the correct reception and storage of said state. Access Node 140 on reception of STUAck message 730 optionally sends a Store State Reply (SSRP) message 740 to End Node X 146 indicating the successful storage of said state in the core.

Messages 650, 660, 670 and 680 are now generated, processed and exchanged in the same way as described in FIG. 6, the difference being that CSMN node 104' has state associated with End Node X 146 in its core state management data 413 (FIG. 4) when it receives STRQ message 660 from Access Node 140'. For that reason the CSMN-STU message 670 is immediately returned.

Hierarchical Core State Management

Figure 8:
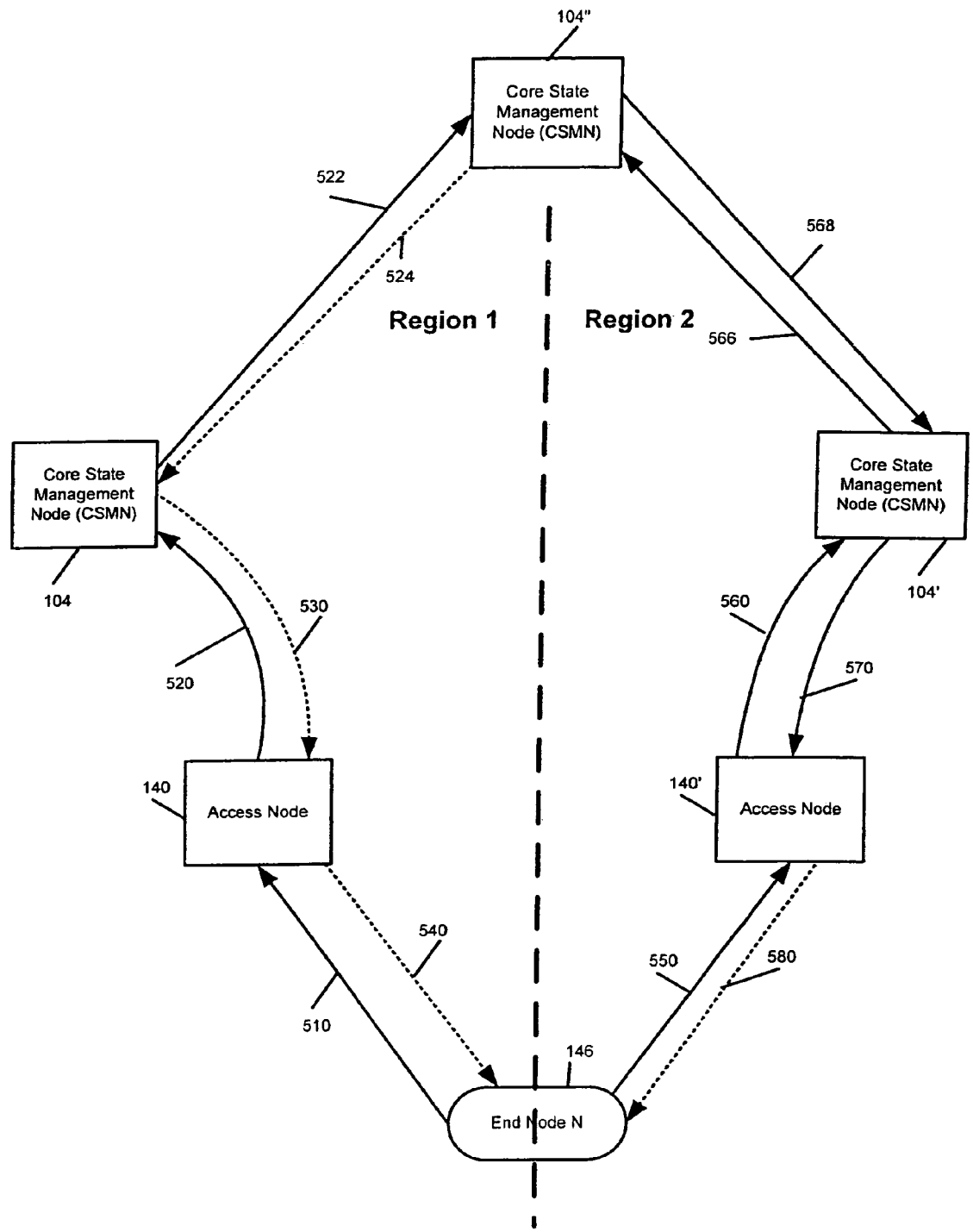
FIG. 8 illustrates alternative signaling performed from FIGS. 6 & 7 when CSMNs are arranged in a hierarchy.

FIG. 8 depicts an alternative embodiment of this invention in which CSMN Nodes are arranged in a hierarchy so that high level CSMN Node 104" maintains copies of all or a part of the state maintained by low level CSMN nodes 104 and 104'. In FIG. 8 messages 510, 520, 530, 540, 550, 560, 570 and 580 are the same as or similar to like numbered messages described in regard to FIG. 5. The difference is that when the CSMN 104 receives message 520, in addition to the processing described in FIG. 5, the CSMN also sends a State Transition Update (STU') message 522 to CSMN Node 104".

On reception of said STU' message 522 including said state and the identifier of End Node X 146, CSMN Node 104" stores the state included in said message in its Core State Management data 413 (FIG. 4) and optionally returns a STU-Ack' message 524 to CSMN Node 104 to indicate correct reception and storage of state. In addition, on reception of STRQ message 560, the core state management module 412 (FIG. 4) of CSMN node 104' processes said message and searches its core state management data 413 for state associated with the End Node X 146 indicated in said message. State associated with End Node X 146 is not found and thus the CSMN node 104' sends State Transfer Request (STRQ") message 566, including the identifier of End Node X 146 to CSMN node 104". On reception of said STRQ" message 566, the Core State Management module 412 (FIG. 4) of CSMN node 104" processes said message and searches its core state management data 413 for state associated with the End Node X 146 indicated in said message. State associated with End Node X 146 that was earlier stored is found and a State Transfer Update (STU") message 568 including said state and the identifier of End Node X 146 is sent to CSMN Node 104'. Now message 570 and the rest of the process described in FIG. 5 is completed as before.

State transfer in accordance with this invention may take place for a number of reasons. In one embodiment of this invention state transfer is initiated by an end node during a handoff process. The end node attempts to terminate connection with one access node and establish a new connection with another access node due to movement, in which case state transfer as part of a mobility management system, enables the efficient and speedy establishment of connectivity with the new access node with as little interruption as possible to the end node data communication. In one embodiment of this invention the state transfer method described is followed by a routing update message from the new access node or the end node redirecting any data traffic towards the new location of the end node. In one exemplary embodiment of this invention such a routing update would be in the form of Mobile IP registration, while in another embodiment would be a Mobile IPv6 binding update.

In an additional embodiment of this invention state transfer is initiated as part of the transition of an end node from an active state to a dormant state, where data communication is temporarily suspended. In this case state transfer ensures that when end node becomes active again at some future time and possibly at some different access node, connectivity can be initiated quickly and efficiently.

In a yet another embodiment of this invention state transfer is initiated when a link between an end node and an access node is lost, in which case the state transfer mechanism is used for robustness, since the end node may attempt to reconnect via another access node at a future time, again making the reconnection process quick and efficient.

Figure 9:
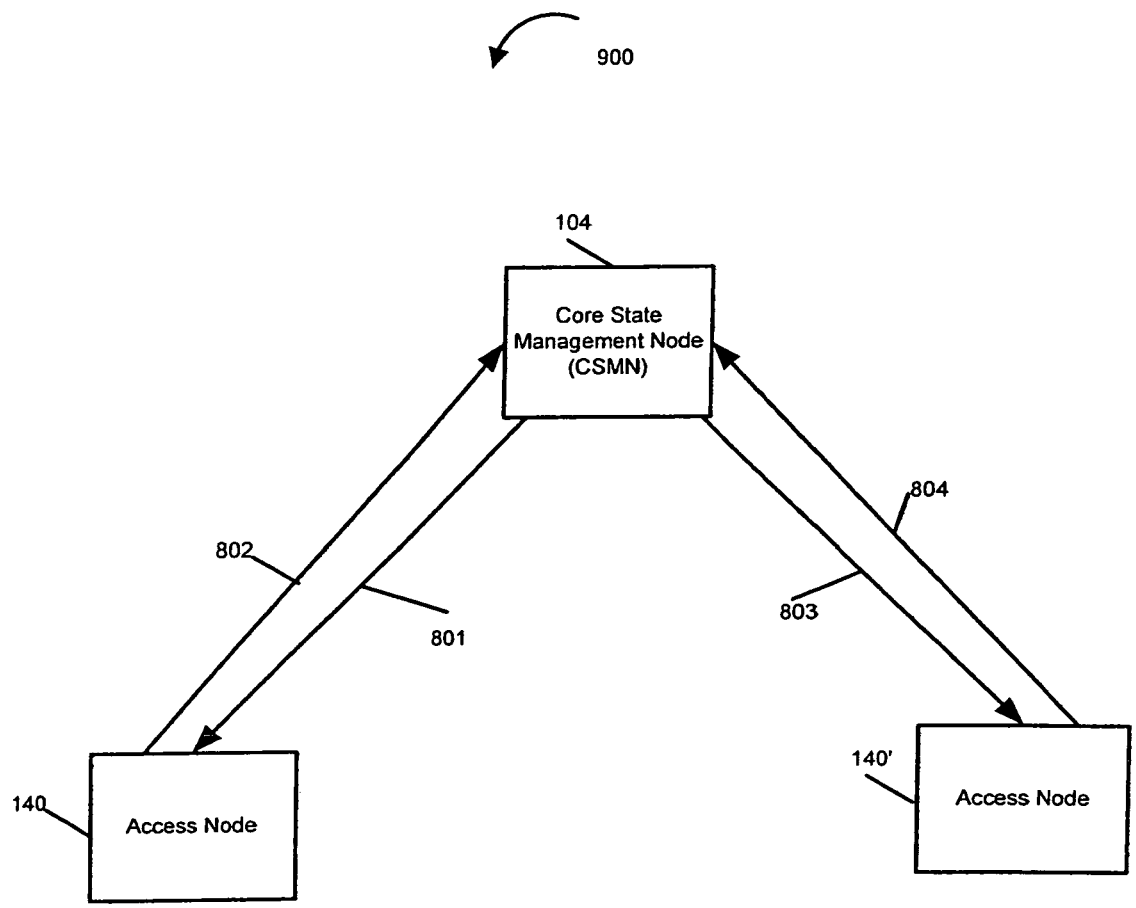
FIG. 9 illustrates a mechanism for CSMN polling of aggregated state from access nodes

FIG. 9 illustrates a communications system 800. FIG. 9 illustrates core state management signaling in a simplified version of the exemplary system depicted in the FIG. 5. FIG. 5 includes access nodes 140, 140' that is the same as, or similar to, the access nodes described in regard to FIG. 3. End node X 146 is the same as, or similar to, end node X 146 of FIG. 2. In addition, Core State Management Node (CSMN) 104 is the same as, or similar to, the CSMN of FIG. 4. Lines between the nodes of FIG. 9 represent state management related messages sent and received according to the present invention and are explained below.

In the FIG. 9 embodiment of the invention CSMN Node 104 periodically, or in response to some trigger event, sends Aggregated State Request (ASR) messages 801, 803 to access nodes 140, 140' respectively. These request messages 801, 803 represent a request for state information. On reception of said messages 801, 803, Access Nodes 140, 140' aggregate the current state information for end nodes associated with said Access Node and return it to the CSMN Node 104 via messages 802, 804 respectively. On reception of messages 802, 804 CSMN 104 de-aggregates the state and stores it in its memory per end node identifier. In this manner the CSMN 104 can control updating of its state information. This update technique can be used in combination with the previously discussed state update techniques. In on embodiment of this invention not all state is returned to the CSMN 104 but only the dynamic state that periodically changes.

In one embodiment of the invention Aggregated State Request (ASR) messages 801, 803 are sent one at a time in a round robin way but also periodically where the periodicity is preconfigured. In an alternative embodiment of this invention Aggregated State Request (ASR) messages 801, 803 are sent in a round robin way but at times were the loading on the server is below a preconfigured threshold. Alternatively, other techniques for scheduling and/or timing messages 801, 803 may be used.

In one embodiment of this invention state transfer is implemented overlaid on the AAA system, in which case state transfer messages are novel extensions to already existing AAA messages (e.g.: RADIUS messages) or they are novel AAA messages. In such an embodiment, the CSMN node may be implemented as a AAA server and belongs to a AAA hierarchy. In an alternative embodiment of this invention the CSMN node is a Mobile Home Agent in which case state transfer messages are implemented as novel extensions to already existing Mobile IP messages or as novel Mobile IP messages. In one embodiment of this present invention, the system is a cellular network. In such an embodiment the access nodes maybe implemented as access routers. Network nodes may be implemented as routers and end nodes may correspond to, e.g., be implemented as, mobile nodes.

Figure 10:
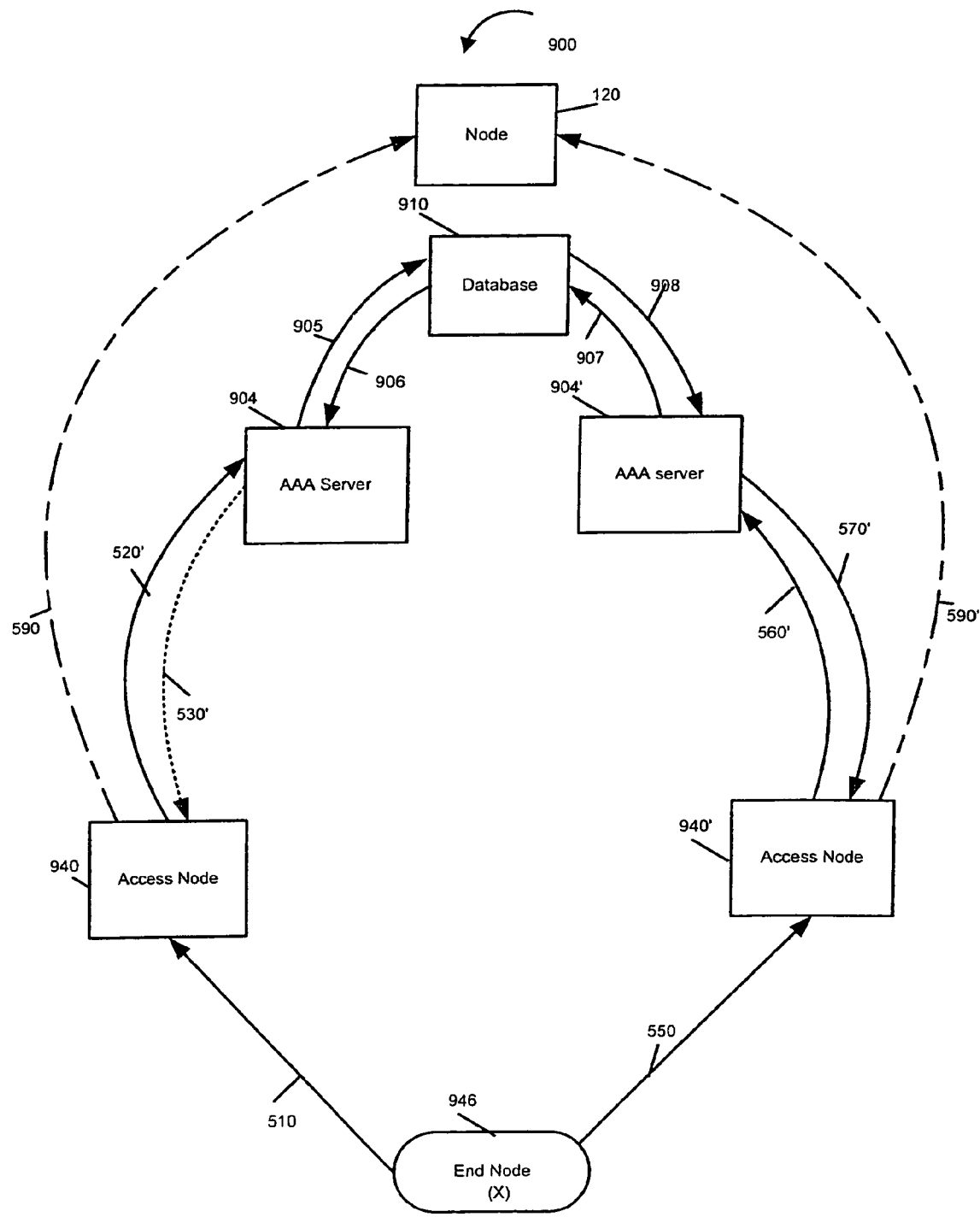
FIG. 10 illustrates an embodiment of this invention based on the AAA system.

FIG. 10 illustrates a communications system 900 which uses a common state information database 910 that can be accessed by multiple server's, e.g., authentication, authorization and accounting (AAA) servers 904, 904'. State information can be retrieved and stored in the database 910 by individual servers 904, 904' in accordance with the present invention, e.g., as part of a handoff operation. The operation may involve a handoff of an end node 946 from a first access node 940 to a second access node 940'.

In the illustrated system 900 end node X 946 has communications links 510, 550 with the first and second access nodes 940, 940', respectively. The system 900 includes one or more additional nodes 120 which perform routing operations. The FIG. 10 system is similar to the system previously described in regard to FIG. 5 and can be implemented using the same or similar elements, e.g., access node and/or server circuitry. Notably the system in FIG. 10 differs from the FIG. 5 system in terms of where state information is stored in the network and the way in which servers access and update the state information. In the FIG. 10 embodiment, a database 910 which is external to the AAA servers 904, 904' is used to store state information. This allows multiple AAA servers to share a common state information database 910 avoiding the need to maintain a separate state information database in each AAA server 904, 904'. This also avoids the need to pass messages between AAA servers 904, 904' as part of a handoff operation as will now be explained in the context of an exemplary handoff operation. Furthermore, it increases the reliability of the system in that the failure of an individual AAA server, e.g.: AAA server 904, does not impact the state transfer process since any AAA server, e.g.: AAA server 904', can retrieve state that was put in the database 910 by any other AAA server e.g.: AAA server 904 connected in the same database 910.

AAA protocols use different sets of messages for Authentication/Authorization (also call AA) e.g.: Access Requests/Replies and different messages for Accounting (also called A) e.g.: Accounting Requests/Replies. Also the AA part of the AAA server typically just reads the database to retrieve the user profile. That is, the authentication/authorization part normally does not write in the database. The Accounting part of the AAA server, however, typically writes in the database to store the accumulated accounting information for a given end node. Typically the records created by the Accounting server are separate from those created by the AA part of the AAA server. The AA and A parts of the AAA system are logically considered to be one thing (i.e.: AAA), yet in some case the AA and A parts of the AAA system may be physically separated, e.g., on different servers which comprise part of the database 910.

In one embodiment of the invention depicted in FIG. 5, messages 520', 530', 560' and 570' are implemented based on new and novel extensions to Authentication/Authorization messages. In FIG. 10 End Node X 946 sends, e.g., at the start of a handoff, a Store State Request (SSRQ) message 510 to Access Node 940 comprising the End Node X 146 identifier. In one such implementation of the FIG. 10 embodiment, the end node identifier is the Network Access Identifier (NAI) typically in the format: user_name@realm. On reception of the SSRQ message 510 the Access Node 940 searches its State Management data 313 (FIG. 3) for state information associated with said end node and sends an Authentication/Authorization Access_Request message 520', equivalent to the AN-STU message 520 in FIG. 5, to the AAA Server 904. Said Access_Request message 520' comprises the End Node X 146 identifier (e.g.: NAI) and state associated with said end node as available to Access Node 140'. The state is transported in some cases in new and novel extensions to Access_Request messages. In one embodiment of this invention said extensions are Attribute-Value-Pairs (AVPs), where an Attribute is the type of state (e.g.: protocol ID) and Value is the actual state information. In an alternative embodiment one AVP is used with Attribute an indicating general state and Value including all state associated with said end node 946 now carried as an opaque object.

On reception of the Access_Request message 520' the AAA Server 904 processes the message and sends a database_ write message 905 to the database to store the state included in said message such that said state is associated with the identifier of the end node also included in said message. The database 910 returns a database_write_ack message 906 to the AAA server 904 indicating the success of the write operation. The AAA node 904 also returns a novel version of Access_Accept message 530' to Access Node 940 indicating the correct reception and storage of said state, rather than the typical grant of access to an end node.

End Node X 946 sends a Retrieve State Request (RSRQ) message 550 to Access Node 940' comprising the End Node X 146 identifier (e.g.: its NAI). On reception of said RSRQ message 550 Access Node 940' sends a Authentication/Authorization Access_Request message 560' (equivalent to STRQ message 560 in FIG. 5) comprising the identifier of End Node X 146 (e.g.: its NAI) to the AAA Server 904'. Note that message 560' is shown to be sent to an AAA server, i.e.: a AAA Server 904' that is different from the server to which the earlier message 520' was directed. This is shown to illustrate that it is not required all the Access Nodes (e.g.: 940, 940') use the same AAA server (904 or 904') as long as the AAA servers (904 and 904') can access the same database 910.

On reception of said Access request message 560', AAA Server 904' processes said message and sends database_read message 907, comprising the end node 946 NAI, to database 910. On reception of message 910 the database searches its memory for state information associated with the End Node X 946 indicated in said database_read message. State associated with End Node X 946 that was earlier stored is found and a the database 910 returns the state in message 908 to the AAA server 904'. On reception of said message 908, AAA server 904' sends Access_Accept message 570' (equivalent to CSMN-STU message 570 in FIG. 5) to Access Node 940' including said state and the NAI of End Node X 946.

On reception of Access_Accept message 570', Access Node 940' stores state included in said message in its state management data 313 (FIG. 3) and grants access to end node 946.

In one embodiment of this invention it is possible that on reception of message 907 the database 910 has no dynamic state associated with said end node 946. In this case database 910 may have static state associated with end node 946 in the form of user profile that is not context transferred. In this case the static state for end node 946 is returned to AAA Server 904' via message 908. In this case AAA server 904' may start normal authentication procedures between itself and End Node 946 before it returns Access_Accept. This characteristic of the invention integrates normal end node authentication with context transfer creating a consistent and robust method for accepting end nodes into the system wither for the first time or following a handoff.

The same or similar functionality can be implemented based on the Accounting part of the AAA server by any expert in the art.

Figure 11:
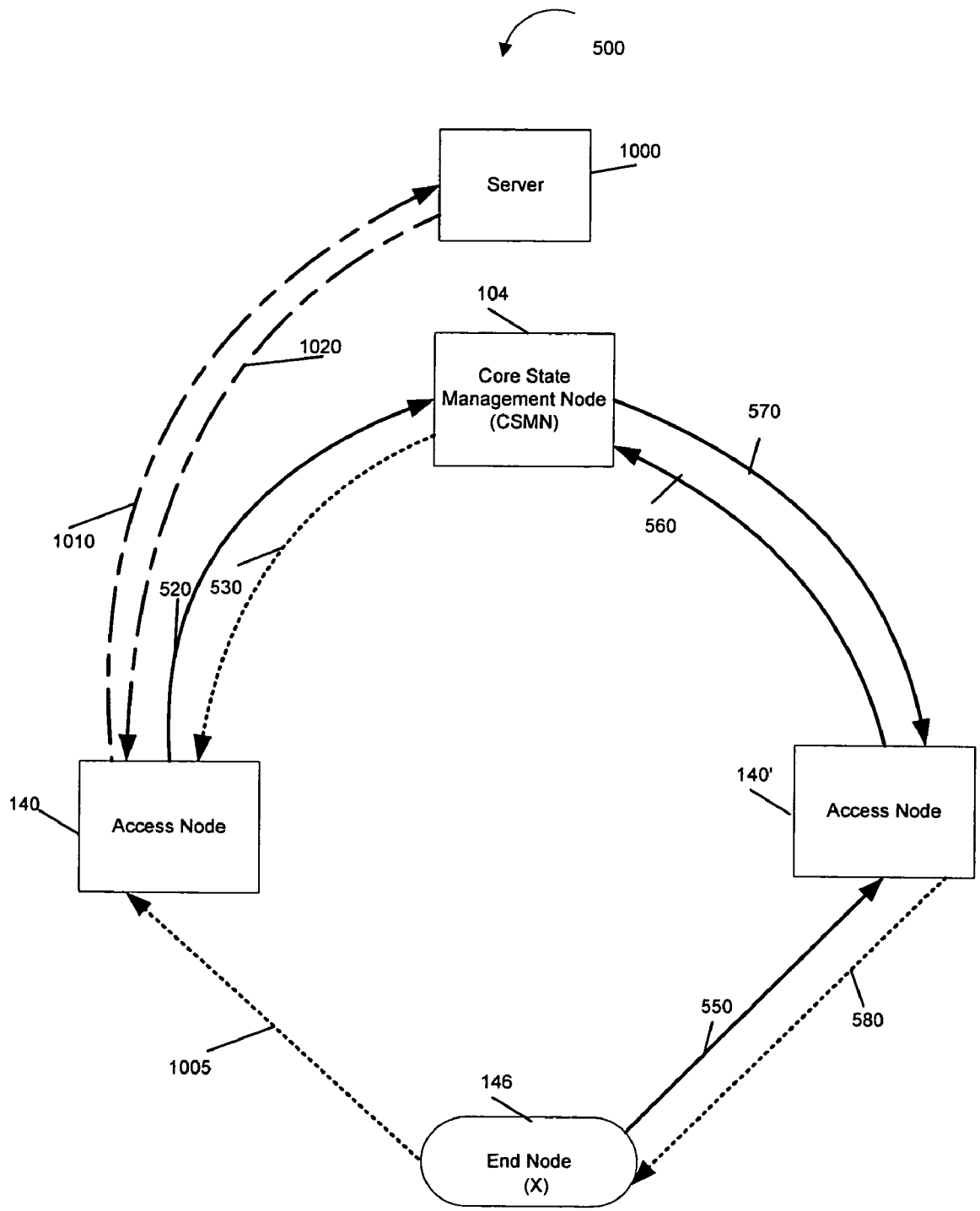
FIG. 11 illustrates various exemplary signaling in a system relating to updating of a core state management node.

FIG. 11 depicts an exemplary embodiment of the invention in which state transfer is triggered by state changes and/or signals which cause state changes in Access Node 140.

In FIG. 11 the processing and content of messages 520, 530, 550, 560, 570 and 580 is the same as or similar to that in FIG. 5 and thus are not described again here. Messages 1005, 1010, 1020 are new messages described below. Server 1000 is an additional element which is not shown in FIG. 5. Server 1000 operates in combination with Access Nodes 140, 140' to provide services to End Node X 146. Exemplary server 1000 may be a AAA server providing access control and user profile services such as supplying service profiles indicating the service a user is authorized to receive. Alternatively, server 1000 could be a Session Signaling server offering voice and/or presence services to said End Node X 146. The server 1000 might be a server which provides some other type of service and is not limited to the two examples just discussed.

In accordance with the exemplary embodiment shown in FIG. 11, an Access Node State Transfer Update (AN-STU) message 520 is generated and transmitted by the Access Node 140 in response to the changing of state corresponding to an end node, e.g., End Node X 146 which is stored internally at Access Node 140. Such a state change may occur due to some internal operation of Access Node 140, e.g.: the expiration of a timer maintained by Access Node 140 associated with End Node X 146 state stored in the Access Node 140.

In some applications, the state change in the Access Node 140 which triggers generation and transmission of message 520 is due to End Node X 146 requesting a service, e.g., via a Service Request signal 1005 transmitted from the end node 146 to the Access Node 140. Said signal 1005 causes Access Node 140 to send corresponding Core Service Request signal 1010 to Server 1000 which, in this example, is responsible for the service requested by End Node X 146. Server 1000, receives and processes Core Service Request signal 1010 and responds with Core Service Response signal 1020. The core service response signal 1020 may be, e.g., a service grant or a service reject signal. Signal 1020 may, and often does, include information about the service offered, e.g., being provided, to the requesting end node X 146. In response to core service response signal 1020 the Access Node 140 may generate, change or remove state associated with End Node X 146 in Access Node 140, e.g., to reflect service information provided in message 1020. This change in state information inside Access Node 140, relating to End Node X 146, will thus trigger the Access Node 140 to generate and transmit AN-STU message 520 from Access Node 140 to CSMN Node 104 to thereby update the CSMN 104 so that the stored state information for End Node X 146 in the core node 104 will reflect the recent changes in the access node 140.

In one exemplary embodiment of this invention Server 1000 is a AAA server that provides authentication and authorization services to End Node X 146 and Access Nodes 140 and 140'. In one such exemplary embodiment Service Request signal 1005 is an Access Request signal that includes information, e.g., an end node identifier, indicating the identity of said End Node X 146. The end node identifier may be, e.g., a Network Access Identifier corresponding to End Node X 146.

Access Node 140 sends, e.g., transmits, Core Service Request signal 1010, which in this example is an Access Request signal including the identity of said End Node X 146, to server 1000. AAA Server 1000 checks the identity of End Node X 146 by examining the access node identifier included in the Request signal 1010 and if the identity is confirmed and the requested service is authorized for the requesting end node X 146, the AAA server 1000 responds with a Core Service Response signal 1020, which in this example is an Access Accept signal. The access Accept signal 1020 will normally include the mobile node identifier of End Node X 146 together with said Node's user profile, e.g., End Node's X 146 static state corresponding to service(s) authorized to be provided to End node X 146 by Access Node 140. Access Node 140 receives state included in said signal 1020 and sends at least some of End Node's X 146 state, e.g., received user profile information, in an AN-STU signal 520 to CSMN Node 104 so that the CSMN Node 104 will include information reflecting the state for End Node 146 stored at the Access Node 140.

Part of the state returned in the Access Accept signal 1020 in some embodiments of this invention is a timer indicating the lifetime of the state included in the signal 1020. Expiration of said timer may also trigger a state transfer AN-STU signal 520, e.g., indicating to the CSMN 104 that the part of the state that has timed out should be removed from the CSMN 104. Thus, timing out and removal of outdated state at the Access Node 140 will trigger a state update message to the CSMN 104 so that the state there will also reflect the change in the state stored at the Access Node 140.

As discussed above, rather than being a AAA server, Server 1000 may be a Mobile IP) Home Agent. In one such embodiment signal 1005 and 1010 are Mobile IP Registration Request Messages and signal 1020 is a Mobile IP Registration Reply message including a Home Address and a Mobile IP Lifetime. In such an exemplary embodiment, Access Node 140 sends AN-STU signal 520, including End Node X's Home Agent address, Home Address, and, optionally, Mobile IP Lifetime, to CSMN 104. This allows CSMN 104 to store and update such state information in response to changes at the Access Node 140 thereby keeping the content of the state information stored at CSMN 104 current.

In some embodiments of this invention expiration of said Mobile IP Lifetime at the Access Node 140 results in removal of the outdated state information in the Access Node. This will trigger a state transfer AN-STU signal 520 to the CSMN 104 signaling that the CSMN 104 should also remove the state which was deleted from the Access Node 140. Alternatively, where the CSMN 140 is supplied with the Mobile IP Lifetime, it may automatically remove the state when the Lifetime information indicates it is no longer valid.

In a yet another exemplary embodiment of this invention Server 1000 may be a Session Initiation Protocol (SIP) server. In such a case, request signals 1005 and 1010 are SIP INVITE Messages and response signal 1020 is a 200OK message. In one such embodiment the 200OK (or other appropriate session establishment) message includes call identifiers relating to a call corresponding to End Node X 146, as well as a SDP description of the call and the resources required for the call to proceed successfully. Access Node 140 sends AN-STU signal 520, including the resources required for said call to proceed successfully to CSMN Node 104 where this information is used to update stored state associated with End Node X 146.

200OK signal or other equivalent SIP signal 1020 in some embodiments of this invention includes a timer indicating the lifetime of the established session. Expiration of said timer, in some embodiments, will trigger a state transfer AN-STU signal 520 signaling to the CSMN 104 expiration of the portion of End Node X 146 state associated with the expired timer.

In some embodiments of the invention the AN-STU signal 520 includes an Access Node identifier, e.g.: an IP Address. In such embodiments signal 520 may also include a local update message count. The local update message count can be generated by a counter local, e.g., internal, to the sending Access Node, e.g., Access Node 140. In the case of an end node specific count, the message count is incremented each time an AN-STU 520 signal is sent for state associated with a given End Node, e.g., End Node X 146. In a more general case, the count is incremented each time a message 520 is sent by the particular Access Node 140. In addition to the local update message count, said message 520, may include a sequence number which is incremented with every AN-STU message across all Access Nodes. The sequence number maybe, e.g., a timestamp, and can be used in messages 520 which do not include the local update message count as well as messages 520 which include a local message count.

On reception of an AN-STU message 520 the CSMN 104 performs one or more of the following checks:

Compares the AN ID, in said message 520, with the current AN ID stored for state associated with an End Node in question, e.g., the End Node associated with the message being checked. If the current AN ID is NULL (e.g., doesn't exist in the CSMN 104) then the state in the received AN-STU 520 is stored in the CSMN 104 and becomes the current state. If Current AN ID matches an existing AN ID in the AN-STU message 520 then a counter value in message 520 is checked against a corresponding counter value stored in CSMN 104. If the counter in the received message 520 indicates that the message is older than the stored state, e.g., the counter is lower than the counter value stored in the CSMN 104, message 520 is rejected. If, however, said counter value included in message 520 is higher than the one stored the state in the CSMN 104, state from the AN-STU message 520 is used to replace corresponding state stored in the CSMN 104 thereby becoming the current state stored in CSMN 104 for the End Node X 146 corresponding to the received message 520. Particular exemplary embodiments which use multiple counter values to determine if a state updated message should be accepted at the CSMN 104 are described in detail with reference to the flow chart 1400 shown in FIG. 14.

An End Node specific counter value, which is access node dependent, e.g., is local to the Access Node which sends the message and will vary depending on which access node generated the message, is included in message 520. This access node dependent, e.g., access node specific, count included in the AN-STU message 520 ensures that newer, more up-to-date state corresponding to a given End Node identified in the message 520 will replace previously stored state that is accessible to the CSMN 104 which was received from the same Access Node. It also makes sure that delayed and/or out of order messages 520 from an Access Node will not result in the overwriting of stored state obtained from more recent state update messages 520 received from the same access node as the delayed message 520. To facilitate this feature, in some embodiments, each access node maintains an AN specific state update message counter for each end node which uses the access node as the end nodes point of network attachement. As state update messages are sent for an end node over time, the access node dependent counter corresponding to the end node is modified, e.g., updated. The access node dependent counter corresponding to an end node may be a timer such as a clock or an state update message counter which monotonically changes (e.g.: increases or decreases) with each state update message transmitted by the end node. The access node dependent count need not be implemented on an end node specific basis and a single access node dependent count could be shared by multiple end nodes, e.g., with the access node modifying the count with each state update message transmitted or as time passes. The access node dependent count can be maintained independently by each Access node 140, 140' and need not be synchronized between the access nodes.

If current AN ID does not match the AN ID in the AN-STU message 520 then the CSMN compares a Access Node independent count such as a timestamp that will be the same regardless of which access node generated the state update request signal 520. The access node independent count may be a timer value which is not access node dependent, e.g., a time stamp based on a signal received from the end node to which the updated state information corresponds or a time stamp corresponding to a timer which is synchronized across multiple end nodes in the system. If this access node independent value, e.g. timestamp, in message 520 indicates that the received message is not newer than the stored state corresponding to the end node identified in the message 520, e.g., if it has a lower or equal value, the update message 520 is rejected. If the AN independent count value, e.g., timestamp, in message 520 indicates the state is newer than the stored state, e.g., if the timestamp has a more recent, e.g., higher value than the store timestamp, then the state in AN-STU message 520 is used to replace the stored state corresponding to the end node identified in the state update message 520 and becomes the current stored state in CSMN node 104 for the identified end node. The full contents of the message 520 may be stored in the CSMN 104 when a state update message is accepted.

The access node independent count value included in a state update message may be, e.g., an End Node specific Sequence Number or timer value that is updated in a known manner, e.g., in an ascending sequence, across all Access Nodes and can be a timestamp that is used to make sure that the latest AN-STU messages will change the state stored in the CSMN while older previously rejected, previously processed or delayed AN-STU messages are rejected.

Wrong Old Access Node

Upon arriving at a new access node 140' or seeking to initiate a handoff to the access node 140', the End Node X 146 may send a signal 550 to the Access node 140' indicating its arrival in cell corresponding to the access node and a desire to connect to and/or handoff to the access node 140'. The message 550 will normally include an End Node identifier identifying the End node 146, information indicating the Access Node 140 which is currently or was most previously servicing the End Node X 146, and may also include an identifier corresponding to Access Node 140'.

The Access Node 140' which is the destination Access Node in the case of an exemplary handoff, requests state from CSMN 104, e.g., in response to message 550, by sending a STRQ message 560 to said CSMN 104. The STRQ message 560 will normally include the End Node X 146 identifier, and the Access Node 140 and 140' identifiers.

On reception of said STRQ message 560, the Core State Management module 412 (see FIG. 4) of CSMN node 104 processes said message 560 and searches its core state management data 413 for state associated with the End Node X 146 identified in said STRQ message 560.

The CSMN node 104 then compares the current Access Node identified in the stored state with the Access Node 140 included in the STRQ message 560. If these do not match the CSMN 104 sends a rejection in message 570 indicating that state is not being supplied in response to message 560. However, if they match, the CSMN 104 provides stored state corresponding to the End Node 146 to Access Node 140' in message 570.

Thus, in embodiments where the information identifying the last used access node 140, e.g., form which a handoff is to occur, in the message 550 does not match the information stored in the CSM 104 indicating the access node most recently used by End Node X, indicating that the state in the CSMN 104 for End Node X 146 is out of date, state may not be returned to access node 140'. In response to a rejection of a state request, Access Node 140 may take steps to create new state for End Node X 146, e.g. by contacting a AAA server or other device.

Re-synch on Handoff

Figure 12:
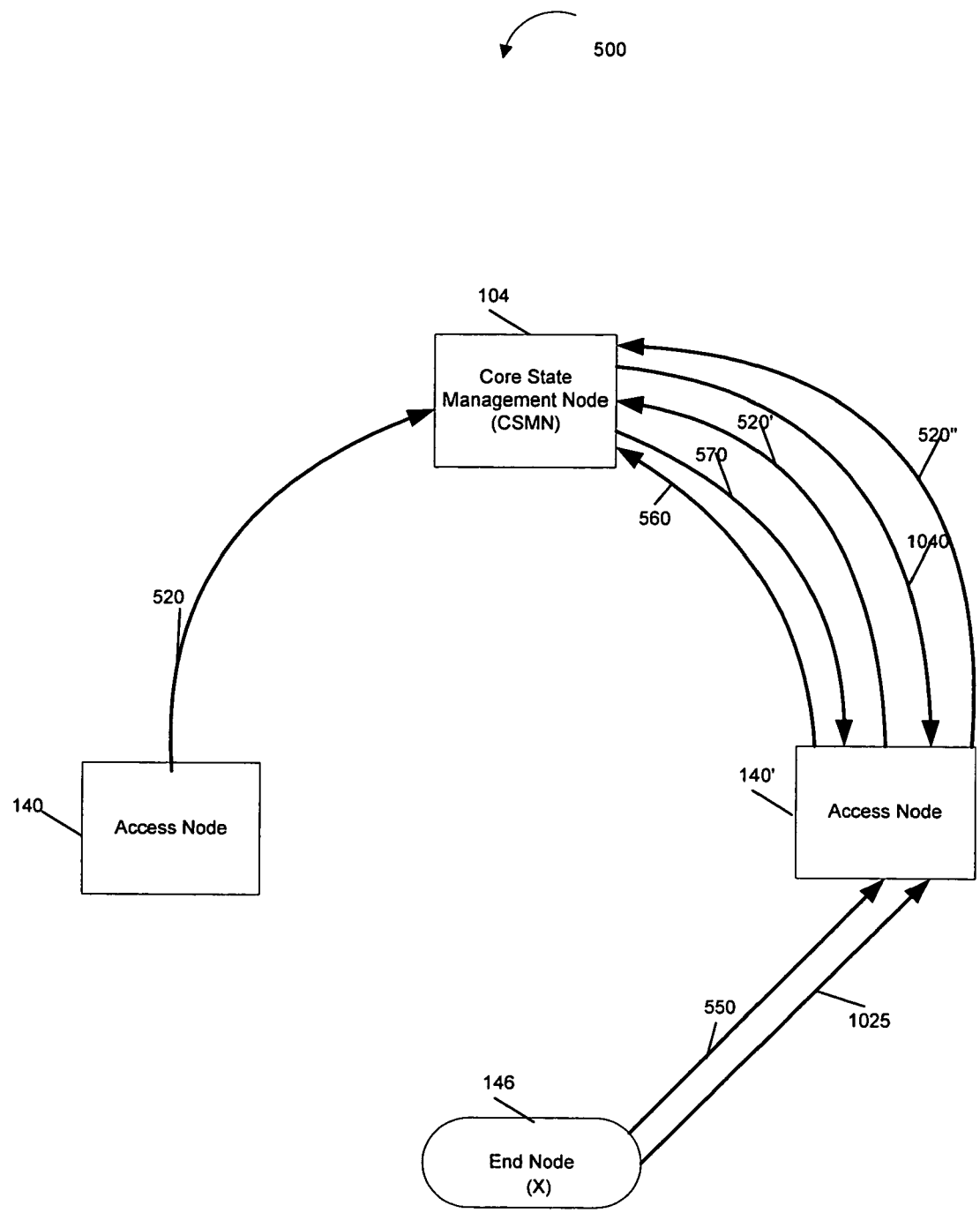
FIG. 12 illustrates various signaling associated with re-synchronization of state information associated with an end node stored an access node, e.g., when the state becomes out of date due to an update of state information at a core state management node by another access node.

FIG. 12 depicts an exemplary embodiment of the invention in which state is re-synchronized between Access Node 140, 140' after state changes in Access Node 140.

In FIG. 12 messages 520, 520', 520", 550, 560 and 570 are the same as or similar to messages bearing the same reference number that are found in FIG. 5. Messages 1025, 1040 are new messages described below.

In some embodiments of this invention End Node X 146 is able to maintain connectivity with at least two Access Nodes, e.g.: Access Node 140 and 140' at the same time. In such an embodiment after initial state retrieval sequence with messages 550, 560 and 570, Access Node 140' is state synchronized with Access Node 140 and thus offers equivalent service with End Node X 146. In some such embodiments it is possible that state in one of the Access Nodes is modified (e.g.: Access Node 140), for example due to End Node requesting additional resources from the network. The state change in one of the access nodes causes, e.g., triggers generation and transmission of an AN-STU message 520 to be sent from Access Node 140 where the change occurred to CSMN Node 104.

In some embodiments of this invention the AN-STU message 520 includes the identifier Access Node 140', in which case the CSMN Node 104 sends the updated state to Access Node 140' in a CSMN-STU message 570 in addition to storing it in the CSMN 104 thereby maintaining synchronization of the state in each of the Access Nodes 140, 140' which are operating as points of attachment for the End Node 146.

In an alternative embodiment of this invention the CSMN node 104 keeps in memory (e.g.: core state management data 413 of FIG. 4) at least the last Access Node it received an STRQ message from (e.g.: Access Node 140') and thus it sends the updated state to Access Node 140' in a CSMN-STU message 570 in response to receiving a state update message 520 corresponding to End Node(X) 146.

In a further embodiment of this invention the state synchronization is triggered by End Node X 146 sending a signal 1025. Is some embodiments of this invention said signal 1025 is the same as or similar to Retrieve State Request (RSRQ) message 550.

In some other embodiments End Node X 146 performs a Mobile IP registration via Access Node 140', in which case signal 1025 is a Mobile IP Registration Request. This causes new state to be created in Access Node 140' (e.g.: a new Mobile IP Lifetime to be set) causing Access Node 140' to send a AN-STU message 520' to CSMN node 104. Said AN-STU message 520' includes the Access Node 140 identifier as well as the counter value included in the CSMN-STU message 570 received earlier. CSMN node 104 then compares the Access Node 140 identifier, counter value and/or timestamp in the message 520' with the corresponding values in the current state stored. If the state stored appears to be newer that the state in the message (e.g.: the counter stored is higher) then the AN-STU message from Access Node 140' is rejected and a CSMN-STU message with the stored state is sent to Access Node 140' in CSMN-NACK message 1040. Following processing of said message 1040, Access Node 140' may send AN-STU message 520" now including the updated state. This time CSMN 104 performs the same checks but the state in AN-STU 520" appears to be newer than the state store and thus state in AN-STU 520" becomes current state in CSMN 104.

Figure 13:
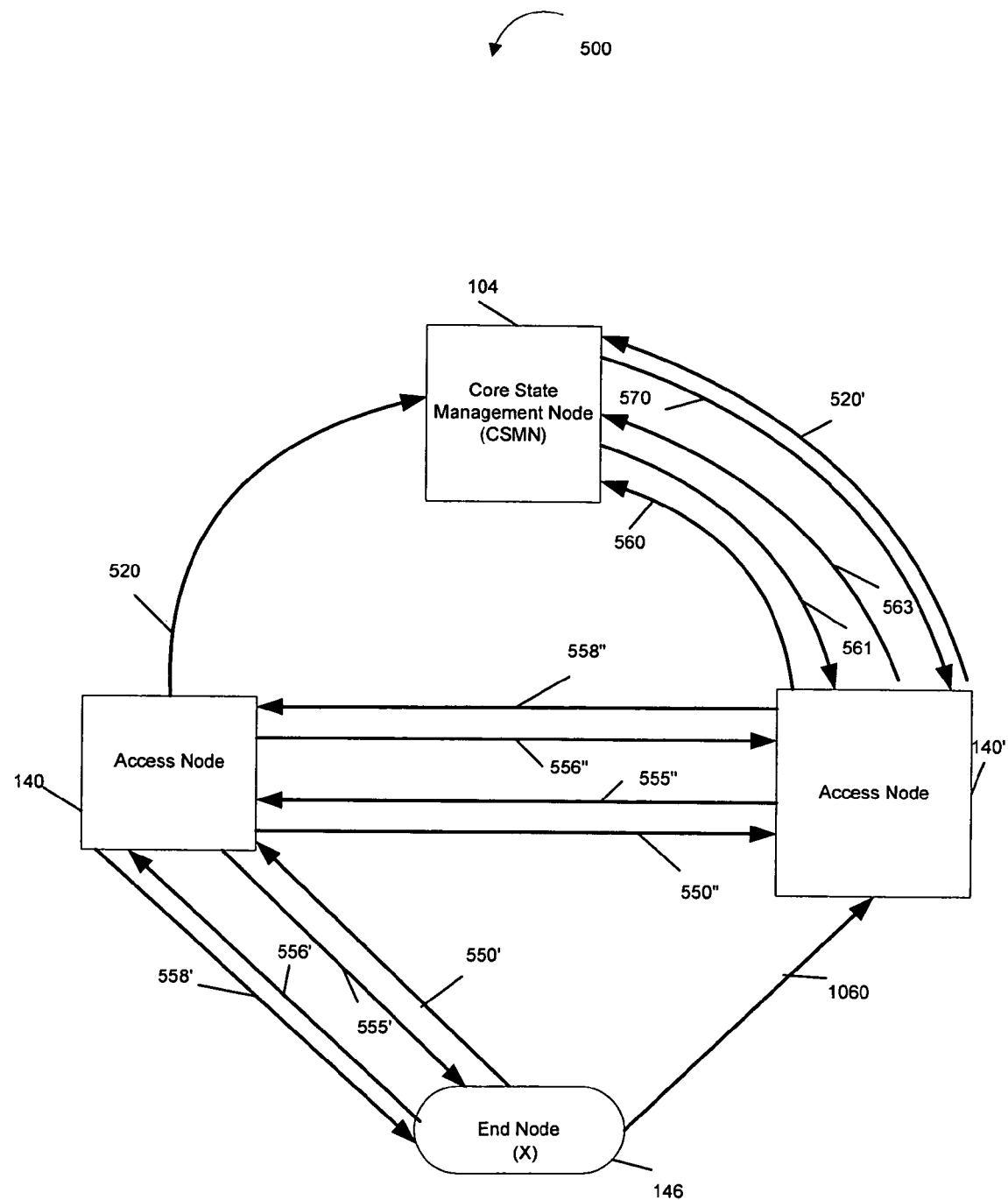

FIG. 13 depicts an exemplary embodiment of the invention in which state transfer in Access Node 140' is initiated via a signal communicated through Access Node 140.

In FIG. 13 Access Node 140 sends AN-STU message 520 as described in FIG. 5 and FIG. 11. The message 520 may be generated, for example, in response to a state change in the access node 140 or in response to a signal causing a state change in Access Node 140 affecting state corresponding to end node 146. The signal 520 may be generated while the access node 140 operates as the end node's point of network attachment for communications purposes, e.g., during a voice or data session or at the start of such a session.

At some point while still connected to the network via access node 140, End Node X 146 sends a message, which is the same as or similar to Retrieve State Request (RSRQ) message 550' of FIG. 5, to first Access Node 140' via Access node 140. This message between the end node 146 and access node 140' is communicated to the access node 140 as message 550 and then onto access node 140' as message 550". Messages 550' and 550" include the same general content such as an End Node X 146 identifier and an Access Node 140' identifier. The message 550' may include an address of Access Node 140' as the messages destination address. Alternatively, message 550' may include an Access Node 140' identifier which Access Node 140 can use to identify the destination address of message 550" via an identifier to address resolution function or via a local mapping. This message may be sent, e.g., when the end node 146 determines it would like the second Access Node 140' to get ready to establish a connection with End Node X but before the end node 146 is able to communicate directly with the second Access Node 140', e.g., because it has not reconfigured its receiver and/or because it is still out of range of the second Access Node 140'. Use of such a message 550' is well suited for break before make handoff's where an end node 146 is unable or unwilling to communicate with two access nodes 140, 140' at the same time.

In other embodiments, e.g., where the end node is able to communicate with multiple access nodes 140, 140' at the same time or easily switch between communicating with two access nodes, the need to communicate with second access node 140' via the first access node 140, prior to establishing a wireless communications link with the second access node 140' may not exist although the mechanisms described are still applicable.

On reception of message 550', Access Node 140 forwards the message 550' or communicates the content of the message 550' to the Access Node 140' as message 550". The reception of message 550" by Access Node 140' may be treated in the same way as the reception of message 550 in FIG. 5, FIG. 11 and/or FIG. 12 in that it triggers a State Transfer Request (STRQ) message 560 to CSMN Node 104. CSMN Node 104, as in FIG. 5 returns a CSMN-STU message 570 to Access Node 140'. At this point and before End Node X 146 has communicated directly with Access Node 140', said Access Node 140' has the state associated with End Node X 146 and thus is ready to offer service to it. End Node X 146 then sends signal 1060 to Access Node 140' including an identifier of itself, e.g., an End Node identifier, to gain access to said Access Node 140'.

In an embodiment where the CSMN 104 is implemented as a AAA server which is responsible for performing device authentication and service authorization operations, the AAA server 104 returns, prior to providing state 570, challenge information in challenge message 561. The challenge information is used by access node 140' to construct a challenge message intended to elicit a response from the end node X which can be used to authenticate the end node 146. The challenge information may be a value generated by the CSMN 104 using a shared secret, e.g., a secure key known to the CSMN 104 and to the end node 146. The challenge information is communicated by the access node 140' to the end node 146 via a challenge message 556" directed to the end node 146 via access node 140. The access node forwards the challenge message as message 555', e.g., using conventional IP routing to direct the message to the end node 146.

The end node 146 responds to the challenge message 555' by generating a response using, e.g., the shared secret stored in the end node and a hash function. A response message 556' is generated and directed to access node 140' via access node 140. Access node 140 forwards the challenge response message 555' as challenge response message 555". The access node 140' communicates the challenge response to the CSMN 104 in a message 563 which, in this example, is a AAA server. The CSMN 104 verifies (authenticates) the end node by comparing the received challenge response to what it expected to receive. Assuming the authentication operation is successful the CSMN then returns state 570 which includes end node configuration information as well as other state information which will be used by the Access Node 140' to set up a communications session and thus provide a service to the end node 146'.

As an alternative to having the CSMN 104 verify that the expected response was received from the end node 146 in reply to the challenge, in some embodiments the CSMN 104 returns with state 570 challenge and expected response information and allows the access node to determine if the expected response is received prior to sending the end node the configuration message 558". In such an implementation, messages 561, 563 can be avoided.

In another embodiment the CSMN 104 returns state 570 including key material that allows Access Node 140' to generate the challenge message 555' by itself. In this case messages 561, 563 can be avoided and the Access Node 140' will perform the authentication operation by examining the challenge response 556" to check if it includes the expected response.

The end node configuration information is communicated to end node 146, in this example, by way of a configuration message 558" which is directed to the end node 146 via access node 140. The configuration message is sent from access node 140 to end node x 146 as message 558'. In this manner, end node X 146 can be authenticated for communication via Access Node 140' and receive configuration information which will be used to communicate via Access Node 140' prior to establishing communications with access node 140' via a wireless communications link. When the end node X is ready to establish a communications link via a wireless connection, is signals access node via message 1060. This signal 1060, which may be a mobile IP registration message, may cause or trigger a state change in access node 140'. This will, in some embodiments, trigger generation of a state update message 520. Message 520 will be sent to the CSMN 104 which will be handled, e.g., as previously discussed with regard to FIG. 12, or as will be discussed in detail with regard to FIG. 14 which follows.

Challenge request and response messages are shown being communicated via the first access node 140, e.g., the access node from which a handoff is occurring. However, in some embodiments, the end node 146 connects to the second access node 140' after sending the message 550' via the first access node 140 and completes the challenge/response process via a wireless connection with access node 140'.

In some other embodiments of this invention the challenge/response exchange takes place between End Node 146 and Access Node 140' via Access Node 140 but then configuration message 558 is sent directly from Access Node 140' to End Node 146 over the wireless link.

In one embodiment of this invention the End Node X 146 ID is a link layer address, e.g.: EUI64. In another embodiment is an IP address while in still yet another embodiment a device identifier, such as a specific number assigned to identify the End Node. In one embodiment of this invention the Access Node 140' identifier is a slope ID, in another embodiment a device ID and in another embodiment is an IP address.

In one embodiment of this invention signal 550' is a link layer message while message 550" is an IP layer message including the content of message 550'. In another embodiment of the invention message 550' and 550" is essentially the same IP layer message sent by End Node X 146 and forwarded by Access Node 140 to Access Node 140'.

Figure 14:
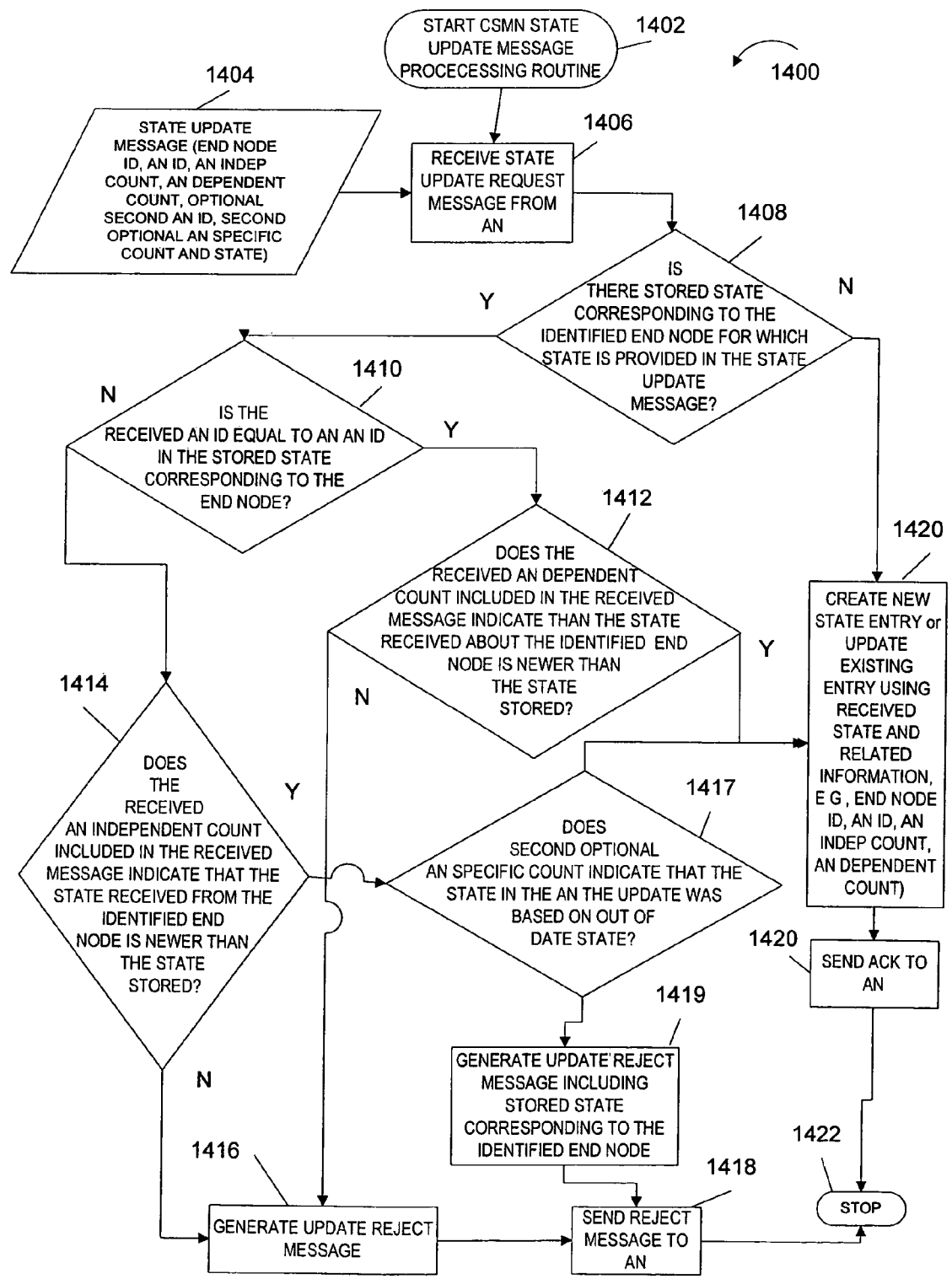
FIG. 14 is a flow chart showing processing performed by a core state management node in response to receiving a state update request message.

Methods and apparatus for using End node identification information such as an end node ID, an Access node dependent count, an Access Node specific count value, and other information which may be included in a state update message sent to the CSMN 104 have been described with regard to the various figures discussed above. One exemplary routine, which can be stored in memory and used to control CSMN updates of state information corresponding to end nodes in accordance with the invention, is shown in FIG. 14. The routine 1400 can be stored in the form of a CSMN state update routine in the memory of a CSMN 104. The routine 1400 can then be executed by a CPU included in the CSMN 104 to control state update operations in response to received state update messages, e.g., messages 520, received from an access node, e.g., access node 140 or 140'.

Figure 15:
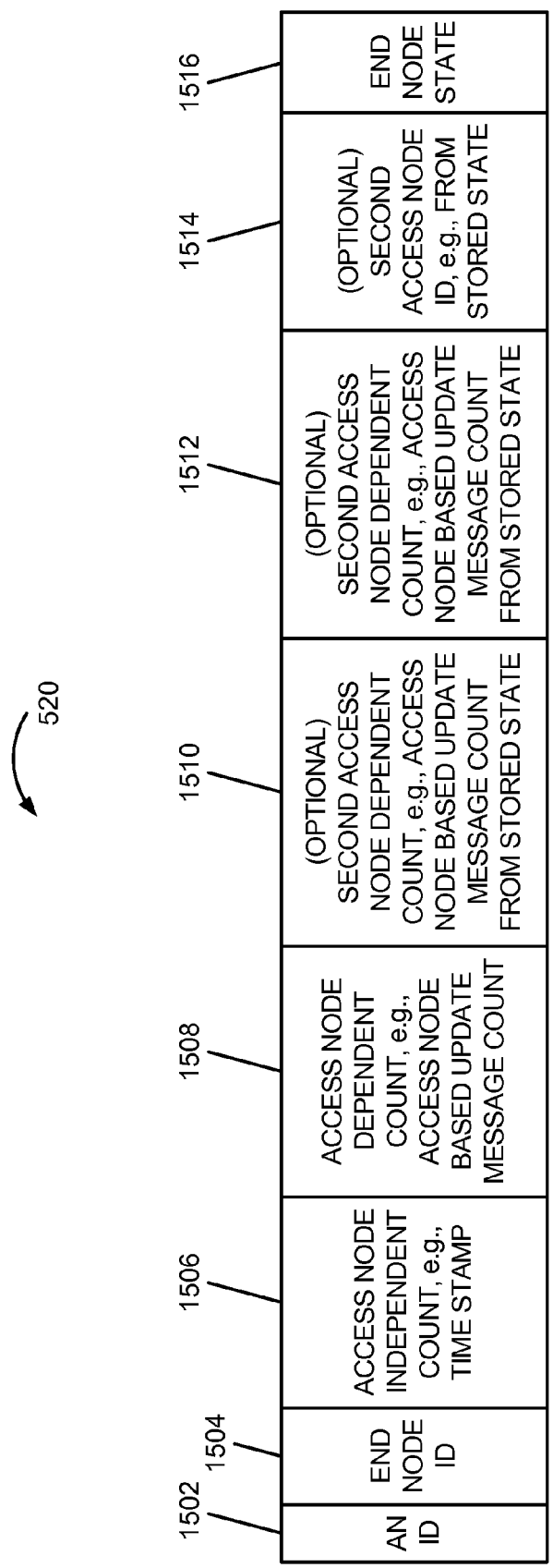
FIG. 15 illustrates an exemplary state update request message.

Before explaining the flow chart 1400 shown in FIG. 14, the contents of an exemplary state update message 520 will first be discussed with reference to FIG. 15. The state update message will be stored on or in a machine, e.g., computer, readable media such as a memory or magnetic storage media. This storage will occur in the CSMN 104 and/or the access node 140, 140' which generates the message. The storage operation may be part of a transmission buffering operation. In some embodiments the contents, e.g., different information elements, of the message 520 are stored as sets of bits which are arranged as a group of bits forming the message 520 in contiguous memory locations and/or in or on a contiguous area of the physical machine readable media. Accordingly, some features of the invention are directed to a novel data structure, e.g., the message 520, as embodied in a physically tangible form, e.g., as bits stored in or on a machine readable media. The order of the elements of message 520 may vary depending on the particular embodiment.

Message 520 as shown in FIG. 5 includes an Access Node identifier 1502, an end node identifier 1504, a first access node independent count 1506, a first access node dependent count 1508, an optional second access node independent count 1510, an optional second access node dependent count 1512, an optional second access node identifier 1514 and end node state. One or more of the optional fields may be omitted. In addition, in some embodiments one of the access node independent count 1506 and the access node dependent count 1508 are used but not both. Which fields are used may vary depending on how the state information included in the message was generated and/or how generation of the update message was triggered.

Access node identifier 1502 identifies the access node which is sending the message 520. End node identifier 1504 indicates, e.g., identifies, the end node to which the state 1516 corresponds. Access node independent count 1506 may be a time stamp or other value which can be used to correlate messages from different access nodes and is therefore access node independent. Access node independent count 1506 may be, e.g., a time stamp signal received from an end node or based on a signal from an end node, e.g., the end node identified by end node id 1504. The access node dependent count 1508 will vary in value depending on the access node which generated the message 520. The access node dependent count 1508 may be a message counter, e.g., corresponding to the identified end node or shared by a plurality of end nodes using the identified access node, which is incremented as state update messages 520 are generated. The access node dependent count may be a timer as opposed to a message count assuming the timer is modified at a sufficient rate that will cause state update messages generated sequentially to be assigned different access node dependent count values.

As will be discussed below, when a CSMN stores state corresponding to an end node, it normally stores the count values 1506, 1508 along with the state 1516. These values will be returned to and stored by an access node in response to a request for state information corresponding to an end node. Thus, when an access node receives and stores state from a CSMN 104, if the received state includes an access node ID 1502, and counts 1506, 1508 it will store these values and return them to the CSMN 104 when updating the state corresponding to the end node identified in field 1504 by including this information as an optional second access node id 1514, optional second access node dependent count 1510 and optional second access node dependent count 1512. These optional values will not be present in the state stored in the access node generating the state update request message 520 if the state in the access node was not generated from state supplied earlier to the CSMN 104 from another access node. Accordingly, these values may or may not be included in a state update message 520 depending on how the state information 1516 included in the message was generated.

Having discussed the general content of an exemplary state update request message 520, processing of such a message in accordance with the exemplary routine 1400 at a CSMN 104, which implements a method of the invention, will now be described in detail with reference to FIG. 14.

The routine 1400 starts in step 1402 with the routine being executed by a CSMN 104. In step 1406, a state update message 520 is received. Thus, step 1406 will be performed each time a state update message 520 arrives at the CSMN 104. The message 520 includes, e.g., the content shown in FIG. 15. For each received state update message 520, operation proceeds from step 1406 to step 1408.

In step 1408, the CSMN 104 checks to determine if there is stored state available to the CSMN 104 corresponding to the identified end node for which state is provided in the received state update message. This may be done by checking a state database included in the CSMN 104 or accessible to the CSMN 104 for any state entries including the end node ID included in the received message. If no stored state corresponding to the end node identified in message 520 is found, operation proceeds to step 1420 wherein a new state entry is created for the identified end node with the information, e.g., the entire content, of the received state update message 520 being stored in the created entry.

However, if in step 1408 it is determined that there is stored state in a state entry corresponding to the end node identified in received state message, the state entry is retrieved and operation proceeds to step 1410. In step 1410, the access node identifier 1502 included in the received state message 520 is compared to an access node ID included in the retrieved stored state information corresponding to the identified end node.

If the received access node ID 1502 matches the access node ID included in the state retrieved from storage, operation proceeds to step 1412 where the access node dependent count is used to determine if the stored state is older than the stored state. For example, assuming an access node increments the access node dependent count each time it sends a state update message, in step 1412 a simple comparison can be used to determine if the received state is newer than the stored state. In such a case, if in step 1412, a comparison indicates that a received access node dependent count is greater than the stored access node dependent count, the state in the received message is newer than the stored state and operation will proceed to step 1420 wherein the stored state is updated.

If, however, in step 1412 it is determined that the state in the received message is older than the stored state, the state update request is rejected and operation proceeds to step 1416 with the stored state corresponding to the identified end node being left unchanged. In step 1416, an update request message is generated and transmitted to the access node which sent the state update message.

If in step 1410, it is determined that the received access node ID 1502 corresponding to the access node which sent the message does not equal the stored access node ID, indicating that the state update is from a different access node than the one which provided the stored state for the identified end node, operation proceeds to step 1414. In step 1414, the access node independent count 1508 in the received message is compared to the access node independent count included in the stored state corresponding to the identified end node to determine if the received state is newer than the stored state. In the case where the access node independent count is a time stamp, a more recent time stamp in the received message would indicate that the received state is newer than the stored state.

If the received state is determined to be older than the stored state in step 1414, the state update request is rejected and operation proceeds to step 1416 wherein a state update reject message is generated. Operation proceeds from reject message generation step 1416 to reject message transmission step 1418.

If in step 1414 if it is determined that the state received from the identified end node is newer than the stored state based on the access node independent count, operation proceeds to step 1417. In step 1417 the optional second access node specific count, which indicates the access node specific count associated with the last state update message received by the access node in regard to the identified end node is examined to determine if the state upon which the received update message 520 is based was at least partially out of date.

A state update message may be based on out of date state in the case where a mobile node maintains connections with multiple access nodes 140, 140' at the same time, e.g., using dual receivers. The end node 146 may switch between using the two wireless communications links depending on which one is better at a given point in time. If a change in state occurs in one access node, e.g., access node 140, due to signals transmitted through the access node, the access node will update the state stored in CSMN 104. However, this change may not have been propagated to the second access node 140'. An attempt to communicate or request a service via access node 140' may trigger a state update message from access node 140' but the supplied state may be partially out of date if it includes information previously received from the CSMN 104, e.g., prior to one or more updates sent by access node 140 after an original update. In step 1417, it is possible to detect that the state update from the access node is based on out of date state because the second optional an dependent counter value included in the state will be different, e.g., lower that the an dependent counter value stored in the CSMN 104.

If in step 1417 it is determined the state upon which the update is based was not out of date, e.g., the optional second AN dependent count 1510 matches or is more current (e.g., greater than) the AN dependent count in the state stored at the CSMN 104, operation proceeds to step 1420 wherein the state is updated, e.g., overwritten, with the state information included in the received state update message 520. From step 1420 operation proceeds to step 1422 wherein an acknowledgement signal is transmitted to the access node which sent the state update message indicating that the state update was performed. Form step 1422 operation proceeds to STOP step 1422 where processing in regard to the received state update message stops.

However, if in step 1417 it is determined that the state upon which the state update message 520 is based is at least partially out of date, operation proceeds to step 1419, without updating the stored state. In step 1419 a state update reject message is generated. The reject message includes the stored state, corresponding to the end node, that was retrieved by the CSMN 104. Thus the reject message will include the most recent state obtained from the last access node to update the state stored in the core which, in the example, was a different access node than the one sending the current state update message being processed. Operation then proceeds to step 1418 where the generated reject message is sent to the access node.

In response to receiving a reject message including state information e.g., state which was originally supplied to the CSMN 104 from access node 140, the access node receiving the state in the reject message, e.g., access node 140' will update its internal state by combining the received state with the most recently generated state changes which had triggered the rejected state update message. The updating of the state in the access node 140' will trigger a new state update message. This time however, the check in step 1417 will be satisfied since the state message will now include a second optional access node dependent count which will match the access node dependent count stored in the CSMN 104.

After sending a reject message 1418, operation in regard to processing a received state message proceeds to step 1422 wherein CSMN processing with regard to the particular received state update message stops.

It should be appreciated that the access node independent count is likely to be used when an end node changes its point of attachment or node through which is has selected to communicate. Such a change is likely to be reflected at an access node to which communication is being switched by the receipt of a signal from the end node used to initiate the change. In some embodiments, the access node independent count is generated by the access node from one or more signals received from an end node, e.g., from time stamps included in one or more end node messages. When a state update is triggered by a message or event other than one related to an access node, it is unlikely to involve a change in what access node the mobile is communicating through. Accordingly, assuming updating of the access node independent count is based on receipt of a signal from a mobile node, this should be sufficient to allow the system to distinguish if a state update message from one access node through which a mobile device communicates is older than another state update message from a different access node through which the mobile device was or is communicating.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is: ,

1. An access node for providing communication of state information. comprising;
an interface for receiving a request message from an end node; and
a processor coupled with a memory configured to:
search the memory for current state information associated with the end node;
generate an update message based on the request message, wherein the update message includes an end node identifier and a time stamp of the current state information; and
initiate the interface to send the update message to a management node to instruct the management node to update stored state information associated with the end node with the current state information.

2. The access node of claim 1 wherein the time stamp is used by the management node for updating.

3. The access node of claim 2 wherein the time stamp is based on an access node dependent count and an access node independent count.

4. The access node of claim 1 wherein the interface receives an acknowledgement message from the management node to indicate successful reception of the update message and successful update to the current state information.

5. The access node of claim 4 wherein, upon receipt of the acknowledgement message, the processor is further configured to generate a reply message to the end node to indicate successful update by the management node.

6. The access node of claim 1 wherein the request message includes an identifier of a new access node, wherein the new access node will begin to provide routing services to the end node.

7. The access node of claim 6 wherein the processor is further configured to initiate the interface to send a copy of the update message to the new access node, wherein the update message include the current state information.

8. The access node of claim 1 wherein the request message is part of a handoff procedure.

9. The access node of claim 1 wherein the request message is a store state request (SSRQ) message, the update message is an access node state transfer update (AN-STU) message and the management node is a core state management node (CSMN).

10. The wireless communication node of claim 9 wherein the update message includes an end node identifier and a time stamp of the current state information.

11. The wireless communication node of claim 10 wherein the time stamp is used by the management node for updating.

12. The wireless communication node of claim 10 further comprising means for receiving an acknowledgement message from the management node to indicate successful reception of the update message and successful update to the current state information.

13. The wireless communication node of claim 12 further comprising means for generating a reply message to the end node to indicate successful update in the management node, wherein the reply message is based on the acknowledgement message.

14. The wireless communication node of claim 10 wherein the request message is part of a handoff procedure.

15. A method for communication of state information, comprising:
receiving a request message from an end node;
searching in a memory unit for current state information associated with the end node;
generating an update message based on the request message, wherein the update message includes an end node identifier and a time stamp of the current state information; and
sending the update message to a storage node to instruct the storage node to update stored state information associated with the end node with the current state information.

16. The method of claim 15 wherein the time stamp is used by the storage node to determine updating.

17. The method of claim 16 wherein the time stamp is derived from an access node dependent count and an access node independent count.

18. The method of claim 15 further comprising receiving an acknowledgement message from the storage node to indicate successful reception of the update message and successful update to the current state information.

19. The method of claim 18 further comprising generating a reply message to the end node to indicate successful update by the storage node upon receipt of the acknowledgement message.

20. The method of claim 19 wherein the request message is part of a handoff procedure.

21. A computer-readable medium including machine executable instructions for:
receiving a request message from an end node;
searching in a memory unit for current state information associated with the end node;
generating an update message based on the request message, wherein the update message includes an end node identifier and a time stamp of the current state information; and
sending the update message to a storage node to instruct the storage node to update stored state information associated with the end node with the current state information.

22. The computer-readable medium of claim 21 wherein the time stamp is used by the storage node for updating.

23. The computer-readable medium of claim 22 wherein the time stamp is derived from an access node dependent count and an access node independent count.

24. The computer-readable medium of claim 21 further comprising machine executable instructions for receiving an acknowledgement message from the storage node to indicate successful reception of the update message and successful update to the current state information.

25. The computer-readable medium of claim 24 further comprising machine executable instructions for generating a reply message to the end node to indicate successful update by the storage node upon receipt of the acknowledgement message.

26. The computer-readable medium of claim 25 wherein the request message is part of a handoff procedure.

* * * * *

UNITED STATES PATENT AND TRADEMARK OFFICE
CERTIFICATE OF CORRECTION

PATENT NO. : 7,668,541 B2
APPLICATION NO. : 10/910960
DATED : February 23, 2010
INVENTOR(S) : O'Neill et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 914 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,668,541 B2  Page 1 of 1
APPLICATION NO. : 10/910960
DATED : February 23, 2010
INVENTOR(S) : O'Neill et al.

It is certified that error appears in the above-identified patent and that said Letters Patent is hereby corrected as shown below:

Column 29, line 8, claim 1: "information." to read as --information,--

Column 29, line 42, claim 7: "include" to read as --includes--

Column 29, line 49, claim 10: "The wireless communication node of claim 9 wherein the update message includes an end node identifier and a time stamp of the current state information." to read as --A wireless communication node for providing communication of state information, comprising:
means for receiving a request message from an end node;
means for storing state information;
means for searching the means for storing for current state information associated with, the end node;
means for generating an update message based on the request message, wherein the update message includes an end node identifier and a time stamp of the current state information; and
means for sending the update message to a management node to instruct the management node to update stored state information associated with the end node with the current state information.--

Signed and Sealed this
Twenty-sixth Day of April, 2011

David J. Kappos
*Director of the United States Patent and Trademark Office*